(12) United States Patent
Hara

(10) Patent No.: US 9,482,441 B2
(45) Date of Patent: Nov. 1, 2016

(54) COMPOSITE MOLDED BODY AND METHOD FOR MANUFACTURING SAME

(71) Applicant: TOKAI KOGYO CO., LTD., Obu-shi, Aichi (JP)

(72) Inventor: Koichi Hara, Obu (JP)

(73) Assignee: TOKAI KOGYO CO., LTD., Aichi (JP)

( * ) Notice: Subject to any disclaimer, the term of this patent is extended or adjusted under 35 U.S.C. 154(b) by 123 days.

(21) Appl. No.: 14/387,164

(22) PCT Filed: Mar. 18, 2013

(86) PCT No.: PCT/JP2013/001838
§ 371 (c)(1),
(2) Date: Sep. 22, 2014

(87) PCT Pub. No.: WO2013/157200
PCT Pub. Date: Oct. 24, 2013

(65) Prior Publication Data
US 2015/0044960 A1    Feb. 12, 2015

(30) Foreign Application Priority Data

Apr. 19, 2012  (JP) .................................. 2012-095468

(51) Int. Cl.
*F24F 7/04* (2006.01)
*B29C 45/16* (2006.01)
(Continued)

(52) U.S. Cl.
CPC ........... *F24F 7/04* (2013.01); *B29C 45/14065* (2013.01); *B29C 45/14336* (2013.01);
(Continued)

(58) Field of Classification Search
None
See application file for complete search history.

(56) References Cited

U.S. PATENT DOCUMENTS 5,603,900 A * 2/1997 Clark .................. B01D 29/012
                                                210/321.75
6,041,840 A * 3/2000 Ogawa ................ B32B 37/1018
                                                156/285
(Continued)

FOREIGN PATENT DOCUMENTS

CN    101365304 A    2/2009
CN    102029682 A    4/2011
(Continued)

OTHER PUBLICATIONS

International Search Report issued in International Application No. PCT/JP2013/001838 dated Jun. 25, 2013 (with translation).

(Continued)

*Primary Examiner* — Gregory Huson
*Assistant Examiner* — Eric Gorman
(74) *Attorney, Agent, or Firm* — Oliff PLC

(57) ABSTRACT

A composite molded body includes a main portion formed of resin, a ventilation channel configured within the main portion, a gas permeable membrane, and two inserted members embedded in the main portion. The ventilation channel has a first ventilation path P1 extending in a direction intersecting the gas permeable membrane and has an opening end leading to the external air, and a second ventilation path extending in a direction different from the direction in which the first ventilation path extends and having an opening end leading to the internal space of the casing. The inserted member forms a portion of the second ventilation path and has a membrane supporting portion formed with a through hole. The through hole constitutes a portion of the first ventilation path, and communicates with the internal space of the casing via the second ventilation path.

20 Claims, 11 Drawing Sheets

(51) Int. Cl.

| | | |
|---|---|---|
| *B29C 45/14* | (2006.01) | |
| *B29C 45/26* | (2006.01) | |
| *B29C 45/37* | (2006.01) | |
| *B29C 45/00* | (2006.01) | |
| *B29C 33/18* | (2006.01) | |
| *H05K 5/00* | (2006.01) | |
| *H05K 5/02* | (2006.01) | |
| *B01D 53/22* | (2006.01) | |
| *B01D 59/12* | (2006.01) | |
| *B29C 45/34* | (2006.01) | |
| *B29K 627/18* | (2006.01) | |
| *B29L 31/34* | (2006.01) | |

(52) U.S. Cl.
CPC ... *B29C45/14467* (2013.01); *B29C 45/14795* (2013.01); *B29C 45/14811* (2013.01); *B29C 45/1671* (2013.01); *B29C 45/2628* (2013.01); *B29C 45/34* (2013.01); *B29C 2045/14131* (2013.01); *B29K 2627/18* (2013.01); *B29K 2995/0065* (2013.01); *B29L 2031/34* (2013.01)

(56) References Cited

U.S. PATENT DOCUMENTS

| | | | | |
|---|---|---|---|---|
| 7,255,354 | B2* | 8/2007 | Tamura | B29C 45/14336 215/261 |
| 9,052,119 | B2* | 6/2015 | Uemura | F24F 13/28 |
| 9,121,626 | B2* | 9/2015 | Uemura | F24F 13/28 |
| 9,295,949 | B2* | 3/2016 | Uemura | B01D 69/02 |
| 9,332,662 | B2* | 5/2016 | Yano | H05K 5/0213 |
| 2002/0025352 | A1* | 2/2002 | Miyajima | B29C 45/34 425/89 |
| 2003/0094101 | A1 | 5/2003 | Hara et al. | |
| 2007/0206067 | A1* | 9/2007 | Blackburn | B41J 2/1753 347/85 |
| 2010/0200566 | A1* | 8/2010 | Komino | H01L 21/67109 219/444.1 |
| 2012/0207970 | A1* | 8/2012 | Kamikawa | B60Q 1/007 428/137 |
| 2013/0012117 | A1* | 1/2013 | Uemura | F21S 48/332 454/275 |
| 2014/0137739 | A1* | 5/2014 | Ishii | H05K 5/0213 96/11 |
| 2014/0271975 | A1* | 9/2014 | Claussen | B29C 33/10 425/425 |
| 2014/0290488 | A1* | 10/2014 | Uemura | F24F 13/28 96/4 |
| 2014/0290489 | A1* | 10/2014 | Uemura | F24F 13/28 96/4 |
| 2015/0313034 | A1* | 10/2015 | Yano | H05K 5/0213 428/68 |

FOREIGN PATENT DOCUMENTS

| | | |
|---|---|---|
| JP | A-2001-155814 | 6/2001 |
| JP | A-2002-347068 | 12/2002 |
| JP | A-2003-152347 | 5/2003 |
| JP | A-2004-358746 | 12/2004 |

OTHER PUBLICATIONS

Jun. 23, 2015 Office Action issued in Chinese Application No. 201380015820.1.

* cited by examiner

FIG. 10
(A)
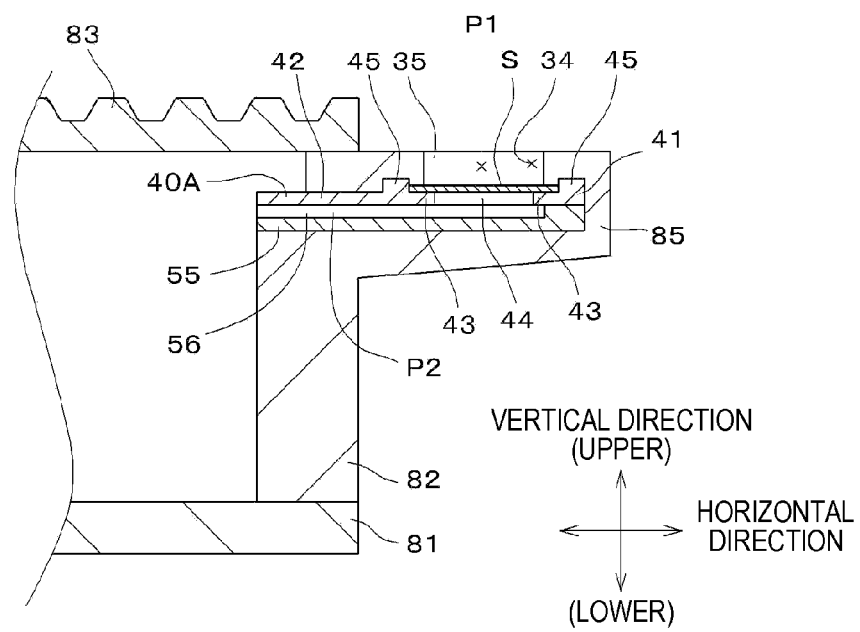
VERTICAL DIRECTION
(UPPER)
HORIZONTAL DIRECTION
(LOWER)
(B)
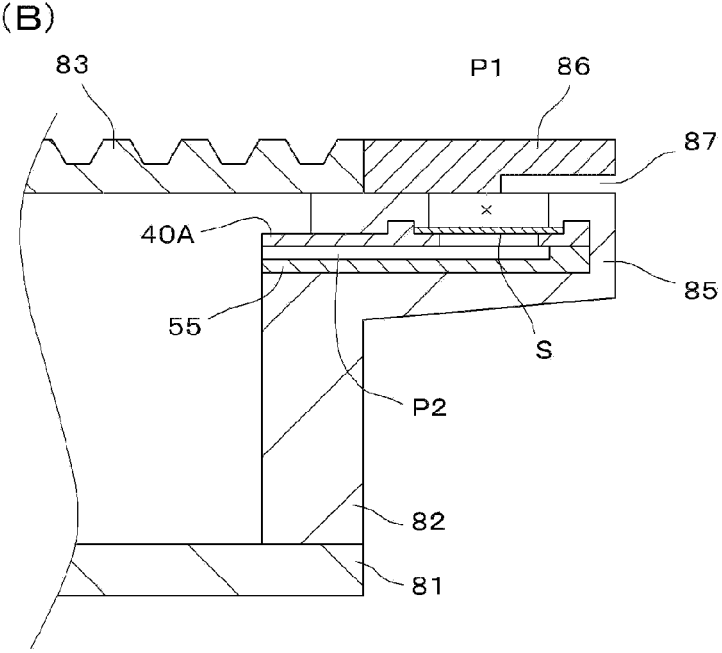

FIG. 11
(A)
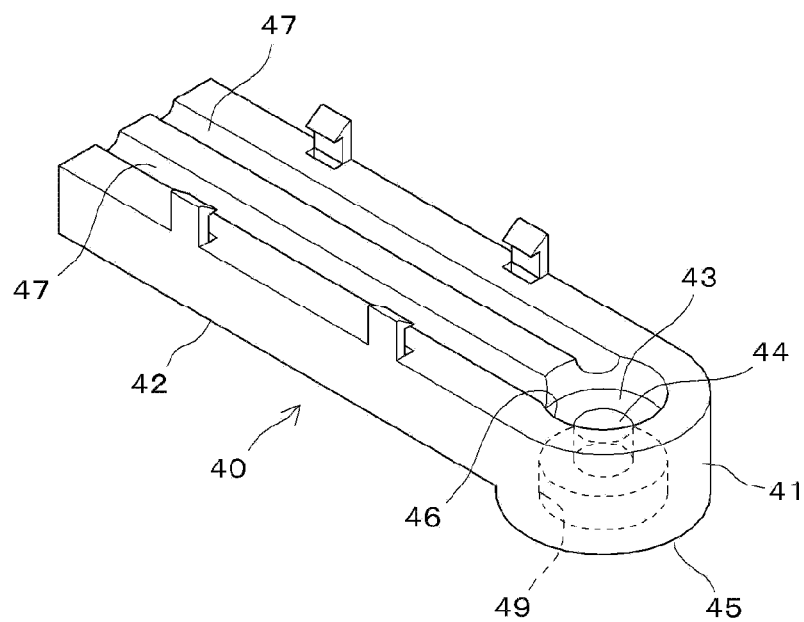
(B)
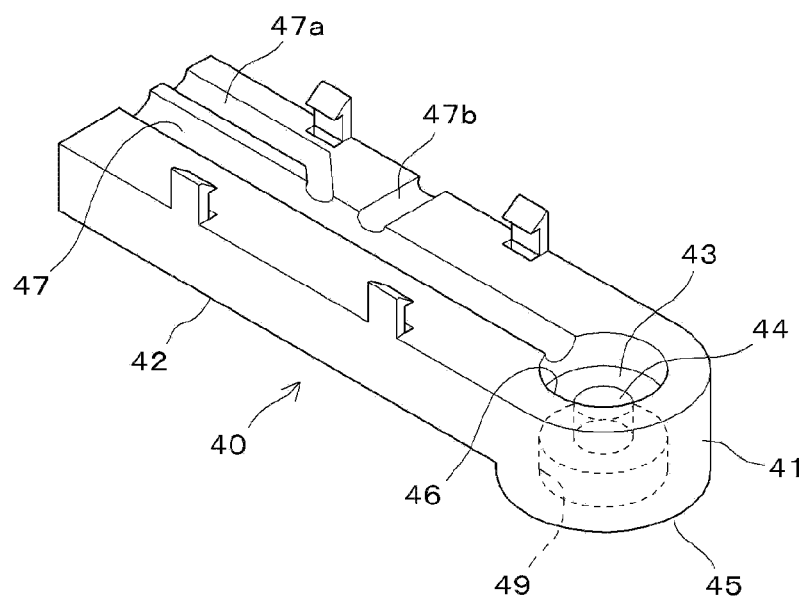

COMPOSITE MOLDED BODY AND METHOD FOR MANUFACTURING SAME

TECHNICAL FIELD

The present invention relates to a composite molded body including a gas permeable membrane integrated by injection molding, and a method for manufacturing the composite molded body.

BACKGROUND ART

In casings used for vehicle-mounted electronic control units or the like, the compatibility between a characteristic in which it is preferable to block the communication between the inside and the outside of a casing (for example, water-proofness or dust-proofness), and a characteristic achieved by permitting the communication between the inside and outside of the case (for example, permeability for preventing occurrence of the pressure differential between the inside and the outside) is required. Under such a request, resin molded products including a gas permeable membrane that blocks water droplets, oil droplets, and dusts but permits ventilation are suggested (see Patent Documents 1, 2, and 3).

The technique of Patent Document 1 (JP-A-2003-152347) solves a problem of a gas permeable sheet being easily damaged because a gas permeable sheet (gas permeable membrane) is exposed to the outside or the like as in a connector case (a resin molded product) of the conventional art. That is, as shown in FIG. 12 of the present application, a casing member (a lid 2 of Patent Document 1) according to claim 1 of Patent Document 1 includes a casing member main body (a lid main body 10 in Patent Document 1) having a first ventilation hole H0, a gas permeable sheet S, and a cover member C1 that has its peripheral edge portion airtightly bonded to the casing member in order to protect the gas permeable sheet S. The cover member C1 is formed with a second air passage hole H1 having a smaller diameter than that of the first air passage hole H0. Also, one ventilation path that extends through the casing member main body in its thickness direction (that is, a direction along the central axis of the first air passage hole H0) is constructed by the first air passage hole H0, the gas permeable sheet S, and the second air passage hole H1. In addition, according to FIGS. 5 to 7 of Patent Document 1, a molding die used for manufacturing the casing member (the lid 2) is constituted by a lower mold (cavity mold F1 in Patent Document 1) that holds the cover member C1, and an upper mold (a core mold F2 in Patent Document 1) that forms a cavity with the lower mold when the mold is closed. The upper mold is able to be brought close to or separated from the lower mold in a vertical direction.

CITATION LIST

Patent Literature

[Patent Document 1] JP-A-2003-152347
[Patent Document 2] JP-A-2002-347068
[Patent Document 3] JP-A-2001-155814

SUMMARY OF INVENTION

Technical Problem

However, the casing member with a protective cover of Patent Document 1 also has various problems.

In a casing member structure and an injection molding method that are shown in Patent Document 1, a space where the gas permeable membrane (gas permeable sheet) is arranged inside the casing member is limited. Therefore, there is a problem that "the degree of freedom in design is low." That is, according to the technique shown in Patent Document 1, the place where the gas permeable membrane is arranged needs to satisfy the following two conditions. Condition 1: A sufficient space to arrange the gas permeable membrane, that is, a space greater than the area of the gas permeable membrane, should be secured, and Condition 2: A surplus space for allowing demolding should be present around the place where the gas permeable membrane is arranged.

More specifically, in an ordinary design, the gas permeable membrane is arranged parallel to a wall surface of the casing member along the wall surface. However, there may be no sufficient room to arrange the gas permeable membrane to the wall surface. Additionally, a separate internal member (for example, a bus-bar or a substrate) is provided within the casing member, and demolding may be difficult or impossible due to the presence of the internal member. Moreover, in the technique of Patent Document 1, a ventilation path (a first air passage hole H0, a gas permeable sheet S, and a second air passage hole H1) built within the casing member is limited to a ventilation path that extends linearly along one direction corresponding to a vertical direction where both the upper and lower molds are brought close to or separated from each other (that is, the direction of a central axis of the first air passage hole H0). In other words, a degree of freedom of configuring of a ventilation channel including the gas permeable membrane is low within the casing member. In such a situation, it is impossible to integrate the gas permeable membrane with the casing member with the injection molding at one time. As a result, an additional process of bonding the gas permeable membrane to the casing member after the completion of the injection molding of the casing member is required.

The invention has been made in view of the aforementioned situation, and the object thereof is to enhance the degree of freedom of design regarding arrangement of a gas permeable membrane and configuration of a ventilation channel in a composite molded body to which the gas permeable membrane is integrally bonded. That is, the object of the invention is to provide a composite molded body with a higher degree of freedom of design compared to the conventional art, and a method for manufacturing such a composite molded body.

Solution to Problem

In a $1^{st}$ aspect of the invention, there is provided a composite molded body that is mountable on or integrated in advance with a casing having an internal space, the composite molded body including:

a main portion formed of an injection-moldable resin material;

a ventilation channel configured inside the main portion to allow the internal space of the casing to communicate with external air; and a gas permeable membrane disposed in a midway portion of the ventilation channel, wherein the composite molded body further includes an inserted member having at least a portion thereof embedded in the main portion, a portion of the inserted member being exposed to at least one of the internal space of the casing and the external air, wherein the ventilation channel includes a first ventilation path having the gas permeable membrane at its midway portion, and at least one second ventilation path continuous with the first ventilation path, wherein the gas permeable membrane is arranged within the first ventilation path so as to block the first ventilation path, wherein the first ventilation path extends in a direction intersecting the gas permeable membrane and has an opening end leading to the external air or the internal space of the casing, wherein the second ventilation path extends in a direction non-parallel to the direction in which the first ventilation path extends and has an opening end leading to the internal space of the casing or the external air, at least a portion of the second ventilation path being formed by the inserted member, wherein the inserted member has a membrane supporting portion having the gas permeable membrane placed thereon and having a through hole formed thereto, and wherein the through hole constitutes a portion of the first ventilation path and communicates with the internal space of the casing or the external air via the second ventilation path.

According to the $1^{st}$ aspect of the invention, the ventilation channel within the main portion of the composite molded body is constituted by the first and second ventilation paths that are continuous with each other but extend in different directions. Thus, the ventilation channel that is bent at its midway portion can be configured, and the degree of freedom of design that the arrangement position of the gas permeable membrane can be freely selected to a certain degree can be ensured. That is, the composite molded body having the gas permeable membrane can be integrally molded by the injection molding at one time, in a state where the gas permeable membrane is arranged in the midway portion of the ventilation channel that is bent at at least one place such that the opening end on the external air side and the opening end on the casing internal space side are not linearly connected together. Additionally, by allowing the gas permeable membrane to be placed on the membrane supporting portion of the inserted member, the gas permeable membrane can be positioned during injection molding, and the gas permeable membrane can be easily arranged in the midway portion of the ventilation channel.

In a $2^{nd}$ aspect of the invention, there is provided the composite molded body according to the $1^{st}$ aspect of the invention, wherein the main portion is formed with a ventilation hole that constitutes a portion of the first ventilation path and constitutes the opening end of the first ventilation path, the ventilation hole being adjacent to the through hole of the membrane supporting portion of the inserted member via the gas permeable membrane, and wherein an inner wall portion of the main portion that forms the ventilation hole is formed with a bonding portion to which the gas permeable membrane is bonded, and an outer peripheral edge of the gas permeable membrane is sandwiched by the bonding portion and the membrane supporting portion of the inserted member.

According to the $2^{nd}$ aspect of the invention, in addition to the effects of the $1^{st}$ aspect of the invention, the following effects are further obtained. That is, as a result of arranging the gas permeable membrane at the boundary position between the ventilation hole and the through hole of the inserted member membrane supporting portion, at a deep part of the ventilation hole formed in the main portion, the outer peripheral edge of the gas permeable membrane is not exposed to the outside. For this reason, compared to a case where the gas permeable membrane is disposed in the vicinity of an external surface of the casing, other things (for example, a person's finger, a tool, or the like) do not contact with the bonding portion. Accordingly, damage to the coupling portion can be prevented, and water-proofness or dust-proofness can be prevented from being impaired.

In a $3^{rd}$ aspect of the invention, there is provided the composite molded body according to the $2^{nd}$ aspect of the invention, wherein both a cross-sectional area of the through hole of the membrane supporting portion and a cross-sectional area of the ventilation hole of the main portion are configured to be smaller than an area of the gas permeable membrane, the cross-sectional area of the through hole of the membrane supporting portion is configured to be smaller than the cross-sectional area of the ventilation hole of the main portion, and a step portion is formed at a boundary position between the through hole and the ventilation hole.

According to the $3^{rd}$ aspect of the invention, in addition to the effects of the $2^{nd}$ aspect of the invention, the following effects are further obtained. That is, the step portion is formed at the boundary position between the through hole of the inserted member constituting the first ventilation path and the ventilation hole of the main portion, and the gas permeable membrane is supported by using this step portion. For this reason, when injection molding is performed, the outer peripheral edge of the gas permeable membrane can be sandwiched by a portion that forms the through hole (that is, the step portion) and the inner wall portion that forms the ventilation hole (that is, the coupling portion), and the gas permeable membrane can be stably held while closing the through hole.

In a $4^{th}$ aspect of the invention, there is provided the composite molded body according to any one of the $1^{st}$ to $3^{rd}$ aspects of the invention, wherein the membrane supporting portion of the inserted member has a peripheral wall portion provided so as to surround the through hole, and an internal diameter of the peripheral wall portion is equal to an external diameter of the gas permeable membrane or is larger than the external diameter of the gas permeable membrane.

According to the $4^{th}$ aspect of the invention, in addition to the effects of the $1^{st}$ to $3^{rd}$ aspects of the invention, the following effects are further obtained. That is, the peripheral wall portion provided at the membrane supporting portion of the inserted member can regulate movement or displacement of the gas permeable membrane in the radial direction of the through hole to contribute to accurate positioning of the gas permeable membrane.

In a $5^{th}$ aspect of the invention, there is provided the composite molded body according to the $1^{st}$ to $4^{th}$ aspects of the invention, wherein the inserted member has an extending portion that extends from the membrane supporting portion, the extending portion extending in a direction non-parallel to the direction in which the first ventilation path extends and being formed with at least a portion of the second ventilation path.

According to the $5^{th}$ aspect of the invention, in addition to the effects of the $1^{st}$ to $4^{th}$ aspects of the invention, the following effects are further obtained. That is, the second ventilation path that connects the opening end at the internal space side of the casing and the gas permeable membrane can be provided by using the extending portion of the inserted member.

In a 6th aspect of the invention, there is provided the composite molded body according to the 1st to 5th aspects of the invention, wherein the inserted member includes a first inserted member and a second inserted member, wherein the first inserted member includes the membrane supporting portion formed with the through hole, and wherein at least one of the first inserted member and the second inserted member is formed with a ventilation groove, and wherein the ventilation groove forms the second ventilation path by bringing the first and second inserted members into contact with each other, and the second ventilation path formed by the ventilation groove communicates with the first ventilation path formed by the through hole of the first inserted member.

According to the 6th aspect of the invention, in addition to the effects of the 1st to 5th aspects of the invention, the following effects are further obtained. That is, by employing the first and second inserted members as the inserted member embedded in the main portion, it becomes easy to form the second ventilation path that extends in the direction different from the first ventilation path that extends in the direction intersecting the gas permeable membrane. As a result, the degree of freedom of setting of the ventilation channel within the composite molded body is enhanced. Additionally, if the ventilation groove is formed in at least one of the first and second inserted members, the second ventilation path can be formed by bringing the first and second inserted members into contact with each other. Therefore, preparation or manufacturing of the first and/or the second inserted members becomes easy.

In a 7th aspect of the invention, there is provided the composite molded body according to the 6th aspect of the invention, wherein the first inserted member is a resin molded product that is molded in advance, and the second inserted member is a metal component that is molded in advance.

According to the 7th aspect of the invention, in addition to the effects of the 6th aspect of the invention, the following effects are further obtained. That is, since the first inserted member is the resin molded product, an inserted member having a desired shape that is conforms to the shape of the main portion can be easily prepared in advance. Additionally, by using a metal component, such as a bus-bar for securing the electrical conduction inside and outside the casing, as the second inserted member, the ventilation channel can be formed without excessively increasing the number of parts.

In an 8th aspect of the invention, there is provided the composite molded body according to the 6th or 7th aspects of the invention, wherein close contact between the first and second inserted members that contacts with each other is assured by a shrinkage force generated when the resin material that forms the main portion shrinks after injection molding.

According to the 8th aspect of the invention, in addition to the effects of the 6th or 7th aspects of the invention, the following effects are further obtained. That is, since the close contact between the first and second inserted members is assured by the shrinkage force after the injection molding, the shape of the second ventilation path is stabilized, and the airtightness of the path wall that constitutes the ventilation path is improved.

In a 9th aspect of the invention, there is provided the composite molded body according to any one of the 1st to 4th aspects of the invention, wherein the inserted member has an elongated plate main portion, and an elongated portion elongating from the plate main portion to one side in its width direction, wherein at least a root of the elongated portion is bendably formed, wherein the plate main portion is formed with a ventilation groove for providing at least the second ventilation path, and the elongated portion is formed with the membrane supporting portion and the through hole, and wherein the through hole and the ventilation groove are formed adjacent to each other via the gas permeable membrane and communicate with each other by folding the elongated portion at the root thereof and superimposing the elongated portion on the plate main portion.

According to the 9th aspect of the invention, in addition to the effects of the 1st to 4th aspects of the invention, the following effects are further obtained. That is, the second ventilation path can be formed simply by performing folding work on a single inserted member having the elongated plate main portion and the elongated portion. In this respect, there is a merit in that the number of members can be reduced.

In a 10th aspect of the invention, there is provided the composite molded body according to the 9th aspect of the invention, wherein close contact between the plate main portion and the elongated portion that are superimposed on each other is assured by a shrinkage force generated when the resin material that forms the main portion shrinks after injection molding.

According to the 10th aspect of the invention, in addition to the effects of the 9th aspect of the invention, the following effects are further obtained. That is, since the close contact between the plate main portion and the elongated portion is assured by the shrinkage force after the injection molding, the shape of the second ventilation path is stabilized, and the airtightness of the path wall that constitutes the ventilation path is improved.

In an 11th aspect of the invention, there is provided the composite molded body according to any one of the 1st to 10th aspects of the invention, wherein a plurality of the second ventilation paths are formed.

According to the 11th aspect of the invention, in addition to the effects of the 1st to 10th aspects of the invention, the following effects are further obtained. That is, by preparing the plurality of second ventilation paths, even if one ventilation path is closed, ventilation can be secured by the other ventilation path.

In a 12th aspect of the invention, there is provided the composite molded body according to any one of the 1st to 11th aspects of the invention, wherein the second ventilation path branches at its midway portion.

According to the 12th aspect of the invention, in addition to the effects of the 1st to 11th aspects of the invention, the following effects are further obtained. That is, since the second ventilation path branches at its midway portion, the number of opening ends on the internal space side of the casing can be made plural according to the number of branches of the second ventilation path, and the opening end of the second ventilation path can be arranged in a required place of the internal space of the casing.

In a 13th aspect of the invention, there is provided a method for manufacturing a composite molded body that is mountable on or integrated in advance with a casing having an internal space, the composite molded body including: a main portion formed of an injection-moldable resin material;

a ventilation channel configured inside the main portion to allow the internal space of the casing to communicate with external air; a gas permeable membrane disposed in a midway portion of the ventilation channel; and an inserted member having at least a portion thereof embedded in the main portion, wherein a portion of the inserted member is exposed to at least one of the internal space of the casing and the external air, the method including:

a preparing step of preparing a molding die capable of forming a cavity when the molding die is closed and capable of arranging the inserted member within the cavity;

an arranging step of arranging the inserted member inside the opened molding die and arranging the gas permeable membrane at a desired position by using the inserted member;

a mold closing step of closing the molding die to form the cavity for molding the main portion;

a resin filling step of filling the cavity with a resin material to mold the main portion; and a mold opening step of opening the molding die and taking-out the composite molded body in which the main portion, the inserted member, and the gas permeable membrane are integrated, wherein the ventilation channel of the composite molded body obtained by using the method includes a first ventilation path having the gas permeable membrane at its midway portion, and at least one second ventilation path continuous with the first ventilation path, wherein the gas permeable membrane is arranged within the first ventilation path so as to block the first ventilation path, wherein the first ventilation path extends in a direction intersecting the gas permeable membrane and has an opening end leading to the external air or the internal space of the casing, wherein the second ventilation path extends in a direction non-parallel to the direction in which the first ventilation path extends and has an opening end leading to the internal space of the casing or the external air, at least a portion of the second ventilation path being formed by the inserted member, wherein the inserted member has a membrane supporting portion having the gas permeable membrane placed thereon and having a through hole formed thereto, and wherein the through hole constitutes a portion of the first ventilation path and communicates with the internal space of the casing or the external air via the second ventilation path.

According to the 13$^{th}$ aspect of the invention, even when the extending direction of the first ventilation path is configured along the opening and closing directions of the molding die (the mold opening direction and the mold closing direction), the extending direction of the second ventilation path can be freely set irrespective of the opening and closing directions of the molding die, and the composite molded body related to the first aspect of the invention can be efficiently manufactured.

In a 14$^{th}$ aspect of the invention, there is provided the method for manufacturing a composite molded body according to the 13$^{th}$ aspect of the invention, wherein, in the mold closing step, the gas permeable membrane is sandwiched by a portion of a mold forming the cavity for molding the main portion and the inserted member, so that an outer peripheral edge of the gas permeable membrane is exposed into the cavity, and wherein, in the resin filling step, the resin material filled into the cavity is bonded to the outer peripheral edge of the gas permeable membrane so as to integrate the outer peripheral edge of the gas permeable membrane with the main portion.

According to the 14$^{th}$ aspect of the invention, in addition to the effects of the 13$^{th}$ aspect of the invention, the following effects are further obtained. That is, since the gas permeable membrane is directly bonded to the main portion, the bonding strength therebetween can be enhanced. As a result, liquids such as water or dusts can be excellently shielded by the gas permeable membrane.

In a 15$^{th}$ aspect of the invention, there is provided the method for manufacturing a composite molded body according to 13$^{th}$ or 14$^{th}$ aspects of the invention, wherein, in the arranging step, the inserted member arranged inside the opened molding die is provided by bringing a first inserted member and a second inserted member into contact with each other or assembling the first inserted member and the second inserted member in advance so as to form at least the second ventilation path between the both inserted members.

According to the 15$^{th}$ aspect of the invention, in addition to the effects of the 13$^{th}$ or 14$^{th}$ aspects of the invention, the following effects are further obtained. That is, since the first and second inserted members are brought into contact with and assembled to each other before being arranged inside the molding die, the formation of the second ventilation path is facilitated by these inserted members.

In a 16$^{th}$ aspect of the invention, there is provided the method for manufacturing a composite molded body according to the 13$^{th}$ or 14$^{th}$ aspects of the invention, wherein, in the arranging step, the inserted member arranged inside the opened molding die is provided by bending and deforming a bendable inserted member in advance so as to form at least the second ventilation path.

According to the 16$^{th}$ aspect of the invention, in addition to the effects of the 13$^{th}$ or 14$^{th}$ aspects of the invention, the following effects are further obtained. That is, since the inserted member is bent and deformed before being arranged inside the molding die, the formation of the second ventilation path is facilitated by the inserted member. Additionally, the number of parts of the inserted member involved in the formation of the ventilation path can be reduced.

BRIEF DESCRIPTION OF DRAWINGS

FIG. 10(A) is an enlarged cross-sectional view taken along line X-X of FIG. 9, and FIG. 10(B) is a cross-sectional view of a modified example including a cover portion.

FIGS. 11(A) and 11(B) are perspective views showing a holder related to another modified example.

BEST MODE FOR CARRYING OUT THE INVENTION

Several embodiments of the invention will be described with reference to the drawings.

[First Embodiment]

Figure 1:
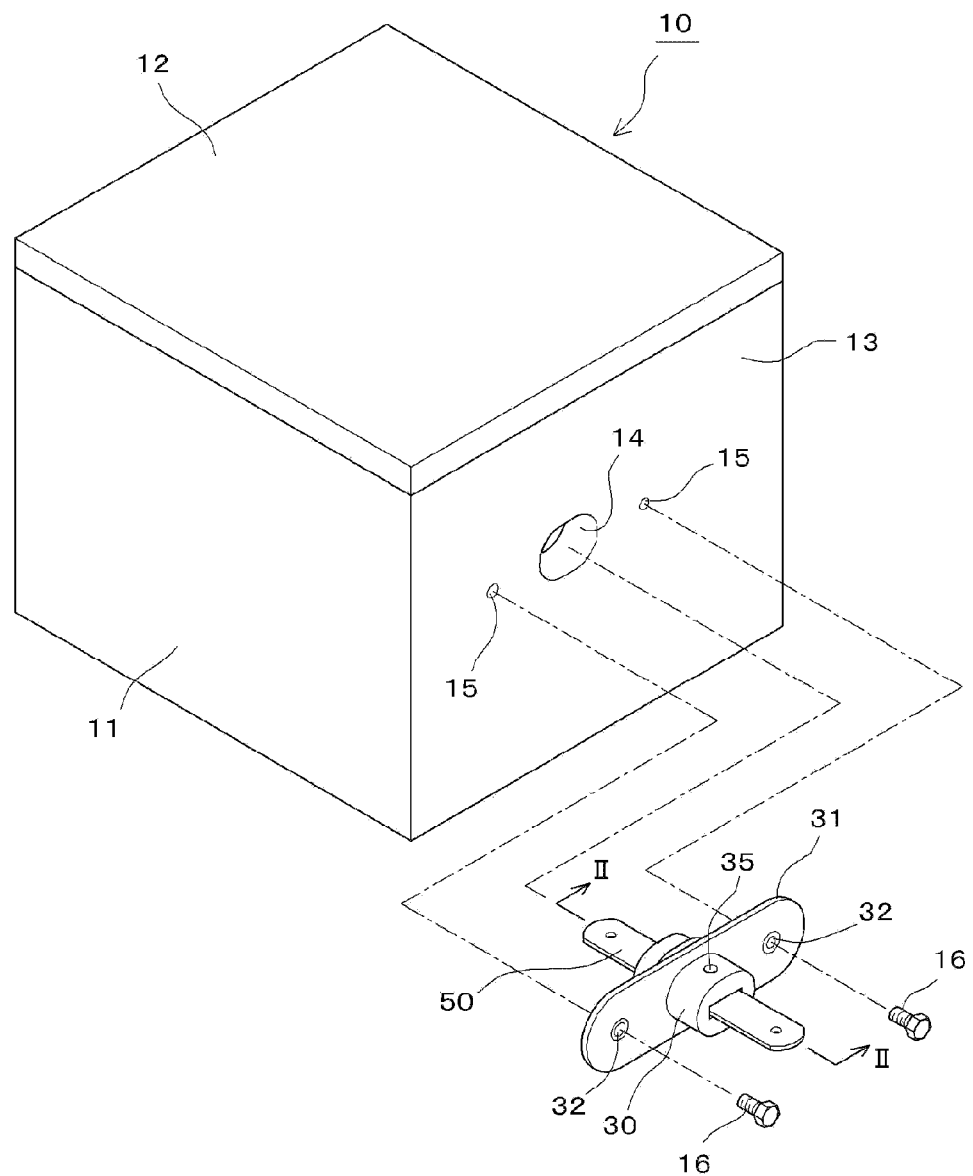
FIG. 1 is a schematic perspective view showing a composite molded body (gas permeable part) and a casing of a first embodiment.

FIGS. 1 to 5 show a first embodiment of the invention. As shown in FIG. 1, a composite molded body related to the first embodiment is a gas permeable part 30 that is mountable on a casing 10. The casing 10 to which a part is mounted is, for example, an electronic control unit for an automobile. The casing 10 includes a substantially rectangular parallelepiped-shaped casing main body 11, and a lid 12 that closes a top opening of the casing main body 11. An internal space in which electronic apparatuses, such as an electronic circuit board, are accommodated is formed by the casing main body 11 and the lid 12. A large-diameter mounting hole 14 and a pair of bolt holes 15 are formed in a side wall 13 of the casing main body 11. Meanwhile, the gas permeable part 30 has an oval sheet-like mounting flange 31. A pair of bolt holes 32 corresponding to the pair of bolt holes 15 are formed in the mounting flange 31. The gas permeable part 30 is fixed to the side wall 13 of the casing by inserting a main portion of the gas permeable part 30 into the mounting hole 14 of the casing, and by overlapping the bolt holes 15 at a casing side and the bolt holes 32 of the mounting flange and screwing the bolts 16 into the respective holes.

As shown in FIG. 2(A), the gas permeable part 30 includes a substantially columnar main portion 33, a holder 40 and a bus-bar 50 as an inserted member embedded within the main portion 33, and a circular gas permeable membrane S.

The main portion 33 of the gas permeable part is formed of an injection-moldable resin material. As available resin materials, polyphenylene sulfide (PPS) resin, polybutylene terephthalate (PBT) resin, and polyamide (PA) resin can be exemplified, and it is also preferable to use fiber-reinforced plastics in which inorganic fillers, such as glass fiber, mica, glass beads, are mixed in such resins.

A ventilation hole 34 as shown in FIG. 2(A) is formed in the main portion 33 of the gas permeable part during injection molding. The ventilation hole 34 extends in a radial direction (a vertical direction in this drawing) of the main portion 33, and has an opening end 35 that opens to an outer peripheral surface (an upper peripheral surface in this drawing) of the main portion 33. A ventilation channel for allowing an internal space of the casing 10 to communicate with the external air is set inside the main portion 33 of the gas permeable part. This ventilation channel is formed mainly by the aforementioned ventilation hole 34, and a ventilation path (to be described below) secured between the holder 40 and the bus-bar 50. The gas permeable membrane S is arranged in the midway portion of the ventilation channel. The detailed configuration of the ventilation channel will be described below.

Figure 2:
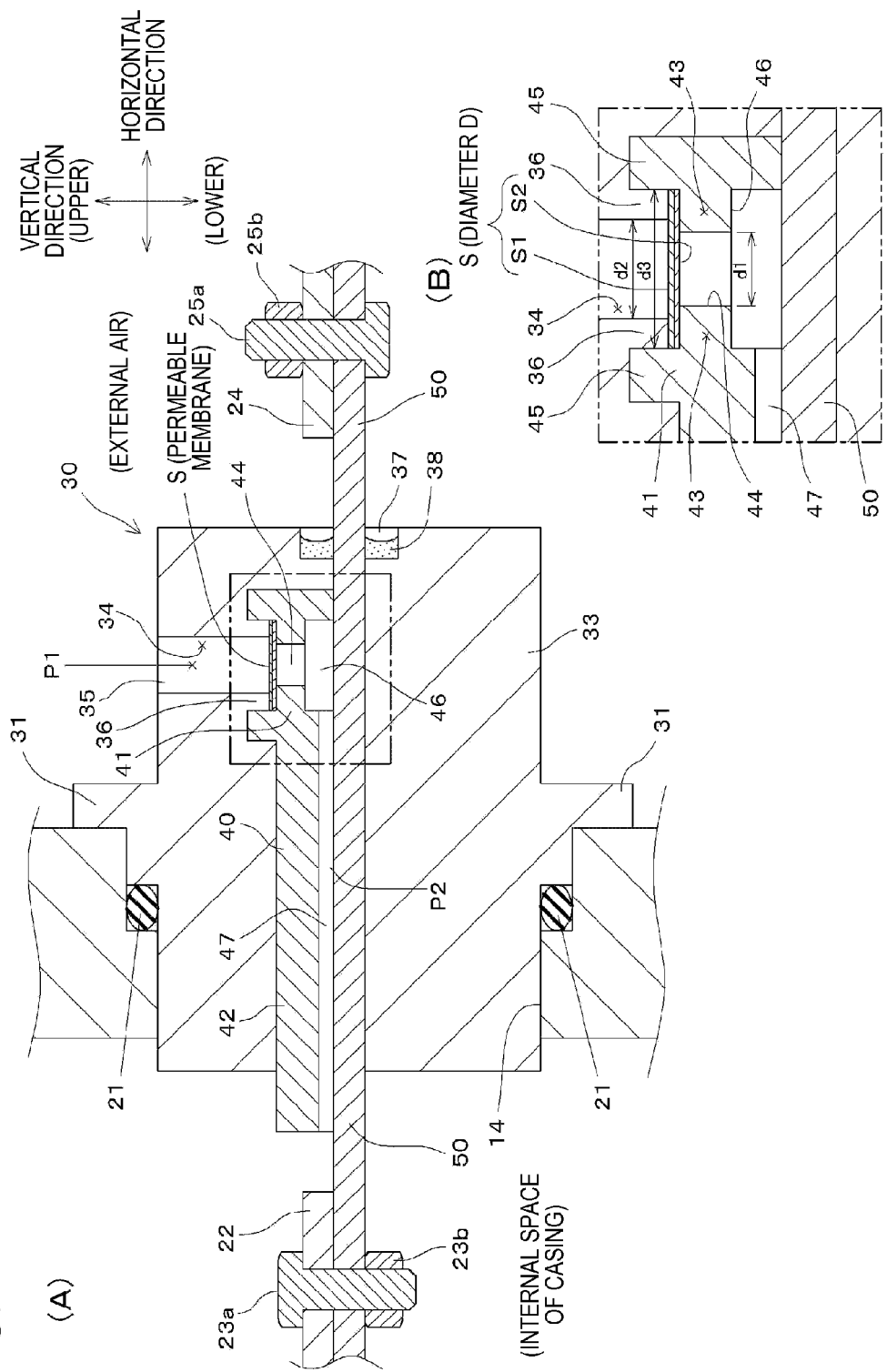
FIG. 2(A) is a longitudinal sectional view taken along line II-II of FIG. 1.
FIG. 2(B) is an enlarged cross-sectional view of main portions of FIG. 2(A).
Figure 3:
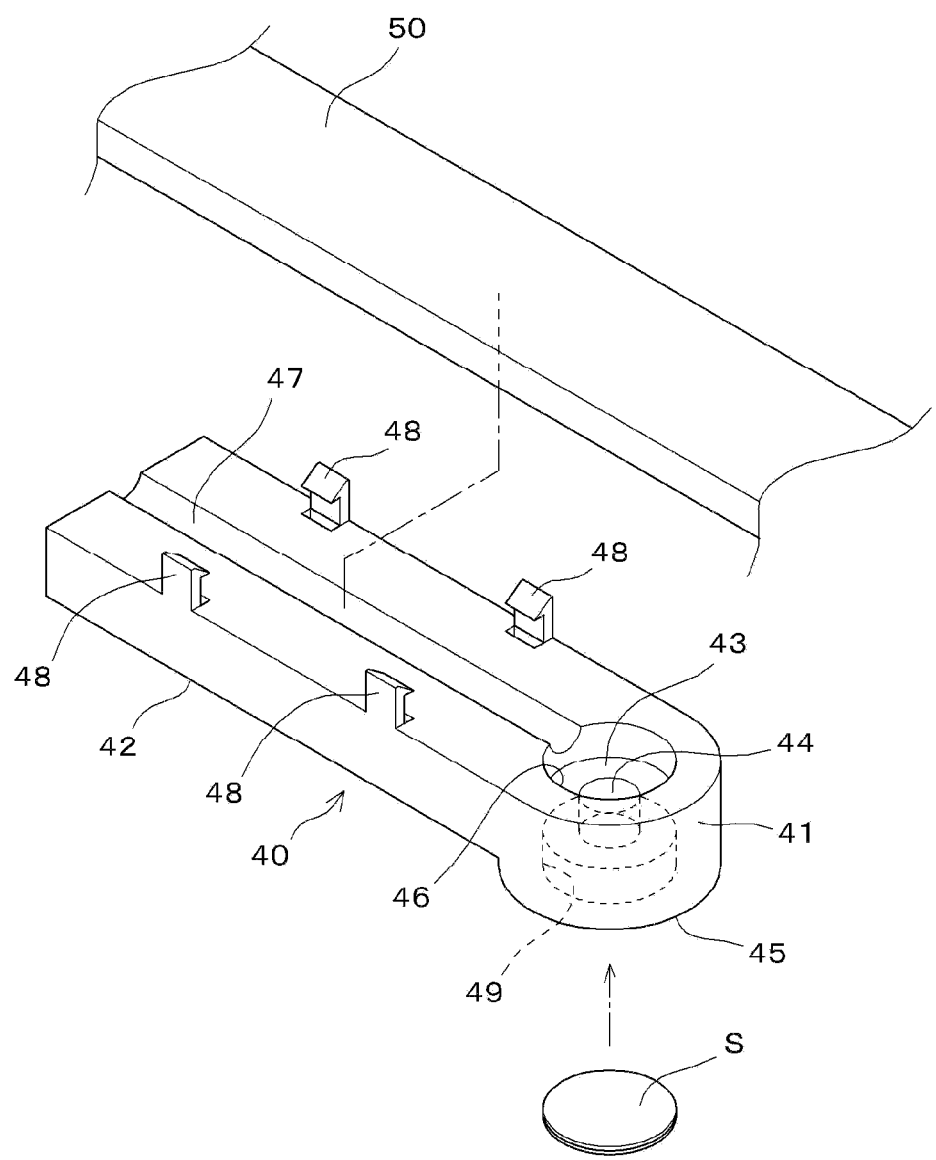
FIG. 3 is a perspective view showing a disassembled state of a gas permeable membrane and first and second inserted members.

As shown in FIGS. 2(A) and 3, the inserted member embedded within the main portion 33 includes the holder 40 as a first inserted member and the bus-bar 50 as a second inserted member. The bus-bar 50 is a flat square bar-shaped metallic plate material having a rectangular cross-section, and is also a conductive material that constructs a conductive path inside the gas permeable part 30. As materials that constitute the bus-bar 50, for example, conductive metals, such as copper, brass, and aluminum are preferable, but for example, conductive organic materials like resin in which carbon fibers are mixed may be used. In addition, the respective inserted members (40, 50) of FIG. 3 are shown in a state where the inserted members are vertically inverted from an arrangement situation shown in FIG. 2.

The holder 40 is a resin molded product and, resins that constitute the holder 40 are preferably the same as those of the main portion 33 of the gas permeable part. In addition, materials that constitute the holder 40 may be resins that are different from those of the main portion 33 of the gas permeable part, and materials that have compatibility with the main portion 33 are preferable. For example, general-purpose resin, such as polypropylene cheaper than the materials that constitute the main portion 33, and elastic materials, such as rubber and thermoplastic elastomer, can also be used. Moreover, if the melting points of the materials that constitute the holder 40 are lower than the melting points of the materials that constitutes the main portion 33, it is preferable that the surface of the holder 40 is melted with the heat of melting resin during the injection molding of the main portion 33 and is firmly secured to the main portion 33.

A membrane supporting portion 41 for supporting the gas permeable membrane S is provided at one longitudinal end portion of the holder 40, and an extending portion 42 extends from the membrane supporting portion 41 toward the other longitudinal end portion of the holder. The membrane supporting portion 41 is formed with a through hole 44 that passes through an inner wall portion 43 located in the midway portion of the entire height in an upper-lower (vertical) direction, and an peripheral wall portion 45 that surrounds the through hole 44 is erected from an upper surface side (a lower surface side in FIG. 3) of the membrane supporting portion 41. Additionally, the inner wall portion 43 that forms the through hole 44 is annular. The annular inner wall portion 43 and the peripheral wall portion 45 construct an upper recess 49 that communicate with the through hole 44 right above the inner wall portion 43. Meanwhile, a lower recess 46 that communicates with the through hole 44 is formed directly below the inner wall portion 43, on a lower surface side (an upper surface side in FIG. 3) of the membrane supporting portion 41. In addition, the inner wall portion 43 and the peripheral wall portion 45 do not necessarily have a continuous annular shape, and may have an intermittent annular shape that is partially cut out. Additionally, the lower recess 46 may not be formed, and the through hole 44 and a ventilation groove 47 to be described later may be made to directly communicate with each other. In this case, the strength of the inner wall portion 43 can be secured.

As shown in FIG. 2 (A), after the injection molding of the main portion 33 is completed, the ventilation hole 34 of the main portion is arranged within an inner region (upper recess) of the peripheral wall portion 45, and five elements of the ventilation hole 34, the through hole 44, the peripheral wall portion 45, the gas permeable membrane S, and the lower recess 46 are concentrically arranged. Here, when the internal diameter of the through hole 44 is d1, the diameter of the ventilation hole 34 of the main portion is d2, the diameter of the peripheral wall portion 45 is d3, the diameter of the gas permeable membrane S is D, in the present embodiment, the dimensions of the respective portions and respective members are set so that the relationships of d1≤d2<D and D=d3 (or D<d3) are satisfied.

That is, from the dimensional relationship of d1≤d2<D, both the cross-sectional area ($\pi d1^2/4$) of the through hole 44 and the cross-sectional area ($\pi d2^2/4$) of the ventilation hole 34 of the main portion are set to be smaller than the area ($\pi D^2/4$) of the gas permeable membrane S. Further, the cross-sectional area ($\pi d1^2/4$) of the through hole 44 is set to be equal to or smaller than the cross-sectional area ($\pi d2^2/4$) of the ventilation hole 34 of the main portion. As a result, a "step portion" is provided by the annular inner wall portion 43 at a boundary position between the through hole 44 and the ventilation hole. Further, by using the step portion 43, the gas permeable membrane S can be placed on the step portion 43 in a state where a central region of the gas permeable membrane S is exposed to the through hole 44. In addition, the shape of the gas permeable membrane S may not be limited to the circular shape as in the present embodiment, but may be, for example, polygons, such as a quadrangle, a hexagon, and an octagon. Additionally, in that case, the shape of the membrane supporting portion 41 may be made to correspond to the shape of the gas permeable membrane S.

Additionally, when the gas permeable membrane S is placed on the step portion 43 at the inner side of the peripheral wall portion 45, from the dimensional relationship of D=d3, movement or displacement of the gas permeable membrane S in the horizontal direction (that is, in the radial direction of the peripheral wall portion 45 and the through hole 44) is regulated by the peripheral wall portion 45, and the gas permeable membrane S is positioned. Then, when the injection molding of the main portion 33 is completed, the ventilation hole 34 of the main portion is aligned with the through hole 44 of the membrane supporting portion in the vertical direction, and is formed adjacent to the through hole 44 across the gas permeable membrane S on the step portion 43. In addition, D<d3 (that is, the inner diameter of the peripheral wall portion 45 is greater than the diameter of the gas permeable membrane S) may be satisfied. In this case, the through hole 44 can be closed with the gas permeable membrane S if the dimensional relationship of (d3−D)<(d3−d2)/2 is satisfied.

In addition, the portion of the main portion 33 that forms the ventilation hole 34 is formed with a coupling portion 36 to which the gas permeable membrane S is bonded. Further, an outer peripheral edge of the gas permeable membrane S is sandwiched by the bonding portion 36 of the main portion and the step portion 43 of the holder. Additionally, the dimensional relationship between the gas permeable membrane S and the bus-bar 50 is not particularly limited, and the gas permeable membrane S may have a larger diameter than the width of the bus-bar 50. The gas permeable membrane S with such a larger diameter can also be used.

A streak of ventilation groove 47 and two or more claw portions 48 are formed on a lower surface (upper surface in FIG. 3) side of the extending portion 42 extending from the membrane supporting portion 41. A total of four claw portions 48 located on both sides of the holder extending portion 42 shown in FIG. 3 in its width direction function as an engaging portion for holding the bus-bar 50 in a state where one surface of the bus-bar 50 is brought into contact with a lower surface (upper surface in FIG. 3) of the holder. The ventilation groove 47 located at the center of the holder extending portion 42 in the width direction is formed over the entire extending portion 42 in its extending direction. When the bus-bar 50 is arranged in contact with the holder 40, the ventilation groove 47 and an opening surface of the lower recess 46 of the membrane supporting portion are closed by the bus-bar 50, and a portion of the ventilation channel in the gas permeable part 30 is formed by the ventilation groove 47 and the lower recess 46.

In summary, the ventilation channel configured inside the main portion 33 of the gas permeable part in order to allow the internal space of the casing 10 to communicate with the external air (specifically, the opening end 35 of the ventilation hole 34) is constituted by the first ventilation path P1 that includes the ventilation hole 34 of the main portion, the gas permeable membrane S, the through hole 44 and the lower recess 46 of the holder membrane supporting portion 41, and extends in the vertical direction (the radial direction of the main portion 33 of the gas permeable part) in the drawing, and the second ventilation path P2 that is formed by the ventilation groove 47 of the holder extending portion 42, and extends in the horizontal direction (the axial direction of the main portion 33 of the gas permeable part) in the drawing. Also, since the gas permeable membrane S disposed in the midway portion of the first ventilation path P1 is horizontally supported by the membrane supporting portion 41, the first ventilation path P1 extends in a direction orthogonal to a film surface of the gas permeable membrane S, while the second ventilation path P2 extends in a direction parallel to the film surface of the gas permeable membrane S. That is, although the first ventilation path P1 and the second ventilation path P2 are continuous with each other via the lower recess 46, these paths extend in different directions (non-parallel directions).

As the gas permeable membrane S, the same type as the gas permeable sheet disclosed in Patent Document 1 can be used. Specifically, as shown in FIG. 2(B), the gas permeable membrane S is a two-layer-structured (or three-layer-structure) membrane in which a backing sheet S2 is laminated on one side (or both sides) of a gas permeable sheet main body S1 (two-layer-structured membrane is used in the present embodiment). As the gas permeable sheet main body S1, a tradename "Gore-Tex" made by W. L. Gore & Associates, Inc. in U.S., a tradename "Temish" of Nitto Denko Corp., and the like are available as commercial items. The material of this gas permeable sheet main body is polytetrafluoroethylene (PTFE) resin, and the thickness thereof is 50 to 200 μm. The gas permeable sheet main body is spongy when viewed at the micro level, and has therein countless fine pores in an irregular shape having a size of about 0.05 to 20 μm. For this reason, although the gas permeable membrane S allows moisture or water vapor in the atmospheric air having a size of 0.0004 μm, and an atmospheric gas (nitrogen gas or oxygen gas) smaller than this moisture or water vapor to pass therethrough, the gas permeable membrane has the property of blocking passing of liquids, such as water droplets or oil droplets having a size of 100 μm (almost a size of drizzle) or greater, and solid foreign matter such as dust. Meanwhile, as the backing sheet S2 laminated on the gas permeable sheet main body S1, nonwoven fabrics including fibers of resins, such as polyamide, polyester, and polyolefin, are suitable. It is preferable that the thickness of the backing sheet S2 be selected so that the thickness of the overall gas permeable membrane S including the gas permeable sheet main body S1 is 0.05 to 0.5 mm (more preferably 0.1 to 0.3 mm) Irregular-shaped countless permeable gaps are formed also inside the backing sheet S2.

When the casing 10 of FIG. 1 is mounted on the gas permeable part 30 of the present embodiment, as shown in FIG. 2(A), an O-ring 21 is interposed between the side wall 13 and the mounting flange 31 of the gas permeable part within the mounting hole 14 of the casing, and the airtightness of the casing is secured. Additionally, one end of the bus-bar 50 provided in the gas permeable part 30 is arranged so as to project into the internal space of the casing 10, and is coupled to an interior bus-bar 22 of the casing by fasteners (for example, a bolt 23a and a nut 23b). Additionally, the other end of the bus-bar 50 is exposed to the outside of the casing 10, and is coupled to an external bus-bar 24 by fastening tools (for example, a bolt 25a and a nut 25b). The electrical conduction between the electronic apparatus within the casing 10 and an external electric circuit is secured via the bus-bars (22, 50, 24). In addition, the bonding between the gas permeable part 30 and the casing 10 may be performed by other bonding methods of not using the O-ring 21. For example, the gas permeable part 30 and the casing 10 may be bonded together using an adhesive. Otherwise, when the casing main body 11 of the casing 10 is injection-molded, the gas permeable part 30 may be integrally molded with the casing main body 11.

In addition, a concave portion 37 is formed at a position that surrounds the bus-bar 50 in an external-air-side end surface (right end surface of FIG. 2(A)) of the main portion 33 of the gas permeable part, and sealant 38 (for example, silicone resin, urethane resin, epoxy resin, or the like) is filled into the recess 37 to close a minute gap that may be present between the bus-bar 50 and the main portion 33.

Next, an injection-molding method of the gas permeable part 30 of the first embodiment will be described.

Figure 4:
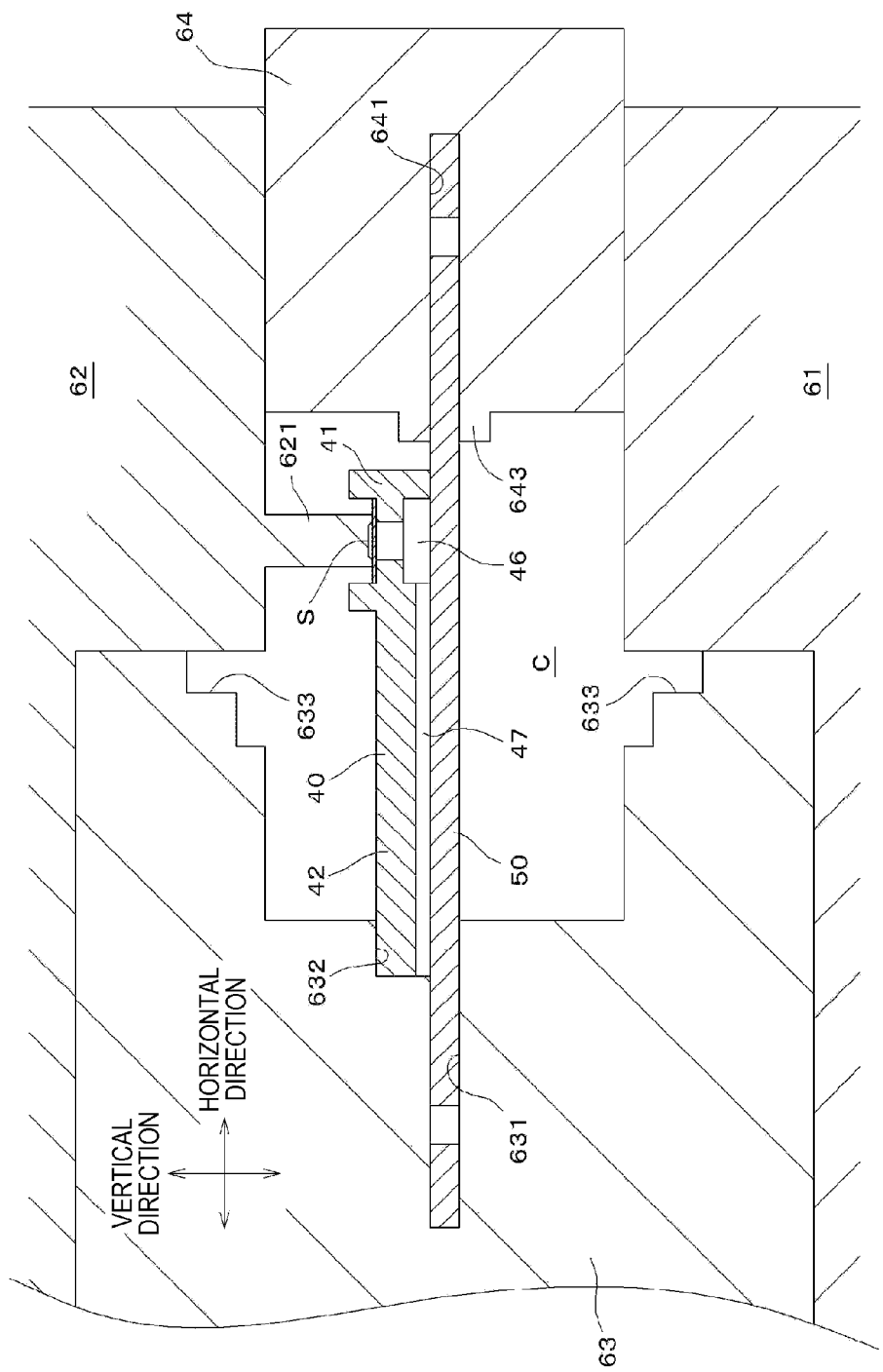
FIG. 4 is a cross-sectional view showing the outline of a molding die for the composite molded body of the first embodiment.

As shown in FIG. 4, the molding die used for injection molding includes a lower mold 61, an upper mold 62, a left slidable core 63, and a right slidable core 64. The lower mold 61 is a fixed mold, and the upper mold 62 as a movable mold is provided so as to be able to be brought close to or separated from the lower mold 61 in the vertical direction. Additionally, the left and right slidable cores 63 and 64 as horizontal movable molds are provided so as to be movable in the horizontal direction. In addition, FIG. 4 shows a state where the mold closing (mold clamping) is completed, and a cavity C for molding the main portion molding is formed by the lower mold 61, the upper mold 62, and left and right slidable cores 63 and 64 during the molding closing.

Each of the left and the right slidable cores 63 and 64 is formed with an insert supporting recess for receiving an end portion of an inserted member to horizontally support the inserted member. Specifically, the left slidable core 63 has a main insert supporting recess 631 for receiving a casing-side end portion of the bus-bar 50, and a sub insert supporting recess 632 for receiving a casing-side end portion of the holder 40 in contact with of the bus-bar 50. The right slidable core 64 has an insert supporting recess 641 for receiving an external-air-side end portion of the bus-bar 50. Moreover, the left slidable core 63 is provided with a ring shaped recess 633 for aiming the mounting flange 31, and the right slidable core 64 is provided with a convex portion 643 for forming the concave portion 37. When the left and right slidable cores 63 and 64 are positioned with respect to the lower mold 61, that is, are arranged at setting positions shown in FIG. 4, both the sliding molds 63 and 64 can support the bus-bar 50 and the holder 40 in a state where these bus-bar and holder have passed through the center of the cavity C horizontally.

Figure 5:
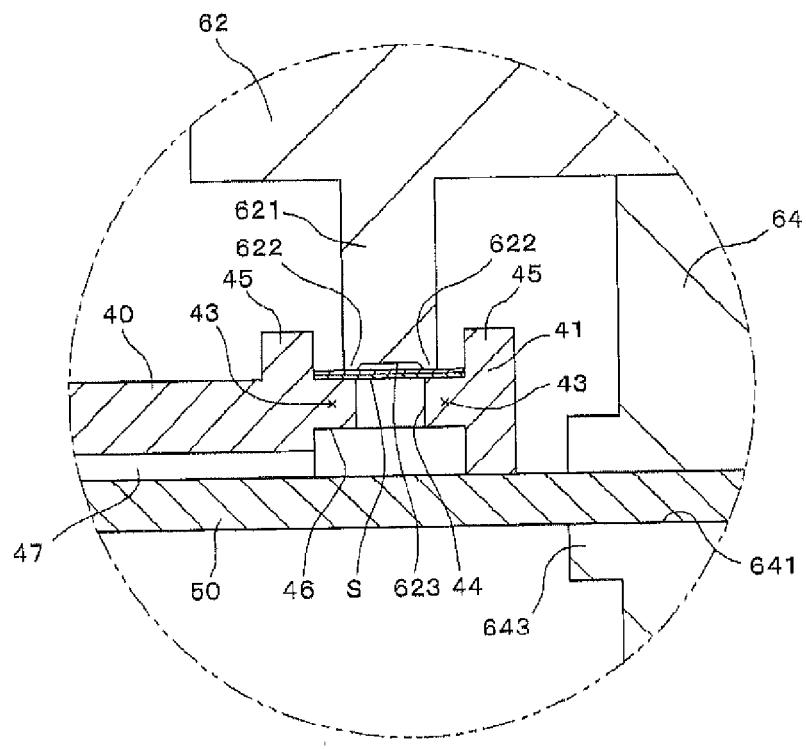
FIG. 5 is an enlarged cross-sectional view of a portion of the molding die shown in FIG. 4.

As shown in FIGS. 4 and 5, a lower surface of the upper mold 62 is provided with a columnar projecting portion 621 for forming the ventilation hole 34 of the main portion. The position of the columnar projecting portion 621 is set so that the projecting portion can be arranged to concentrically face the through hole 44 of the membrane supporting portion 41 of the holder arranged within the cavity C. A ring shaped projection 622 is formed along a tip outer peripheral edge at a tip surface (lower end face) of the columnar projecting portion 621, and a dish shaped recess 623 that is recessed upwards is secured inside the ring shaped projection 622. During the mold closing, the ring shaped projection 622 of the columnar projecting portion abuts against an upper surface of the gas permeable membrane S held by the holder membrane supporting portion 41, and the gas permeable membrane upper surface is divided into an inner region (an inner circular region that faces the through hole 44), and an outer region (an outer edge portion placed on the step portion 43). In that case, the dish shaped recess 623 provides a gap for avoiding that the inner region on the upper surface of the gas permeable membrane directly comes into contact with the columnar projecting portion 621 (or in order to secure a state of non-contact with the columnar projecting portion 621). The outer region on the upper surface of the gas permeable membrane is exposed into the cavity C, and the inner region on the upper surface of the gas permeable membrane is separated from the cavity C. In addition, a gate path (not shown) for introducing molding resin into the cavity C is provided in the upper mold 62.

An injection molding procedure of the gas permeable part 30 after the completion of the preparation of the aforementioned molding die includes an inserted member and the gas permeable membrane arranging step, a mold closing step, a resin filling step, and a mold opening step.

(Inserted Member and Gas Permeable Membrane Arranging Step)

First, as shown in FIGS. 3 and 4, the bus-bar 50 is brought into contact with a lower surface of the holder 40, and both are temporarily integrated using the claw portions 48 of the holder. One-side end portions of the holder 40 and the bus-bar 50 that are temporarily integrated are inserted into the main and sub insert supporting recesses 631 and 632 of the left slidable core 63 in a mold opening state to support the holder 40 and the bus-bar 50 in a cantilevered state. Subsequently, both the sliding molds are set at the setting position (advance position) of FIG. 4 by horizontally moving and positioning the left slidable core 63 and the right slidable core 64 with respect to the lower mold (stationary mold) 61 so that the left slidable core 63 and the right slidable core 64 are brought close to each other. After the setting of the left and right slidable cores 63 and 64 is completed, the other end portion of the bus-bar 50 in a free end state is inserted into the insert supporting recess 641 of the right slidable core 64, and the bus-bar 50 is supported in a supported state at both ends. This positions the bus-bar 50 at a predetermined position in a space that shapes the cavity C. Meanwhile, the holder 40 on the bus-bar 50 is positioned with respect to the bus-bar 50 by one end portion thereof being fitted into the sub insert supporting recess 632. That is, the holder 40 is also positioned at a predetermined position in the space that shapes the cavity C via the bus-bar 50. In this way, the holder 40 and the bus-bar 50 that are temporarily integrated are supported in a horizontal posture between the left and right slidable cores 63 and 64. Then, the gas permeable membrane S is placed on the step portion 43 of the membrane supporting portion 41 of the holder 40 that has maintained the horizontal posture. Accordingly, the gas permeable membrane S is also positioned at a predetermined position in the space that shapes the cavity C via the holder 40 and the bus-bar 50. Here, the order of arranging members, such as the holder 40, the bus-bar 50 and the gas permeable membrane S inside the cavity C can be arbitrarily set within a possible range. For example, the holder 40 may be arranged within the cavity C in a state where the gas permeable membrane S is placed on the holder 40. Additionally, opening edges of the insert supporting recesses 631 and 632 are chamfered (not shown) so that the inserted members are not damaged during insertion. Moreover, a clearance to such an extent that enables insertion of an inserted member and does not cause the inserted member to be rattled during supporting is provided between the inserted member and the insert supporting recess.

(Mold Closing Step)

Next, the upper mold 62 that was on stand-by above the lower mold 61 is moved downward (advanced) so as to be brought close to the lower mold 61, and are abutted to the left and right slidable cores 63 and 64 arranged at the setting position (see FIG. 4). An upper opening of the cavity is closed by the abutment between the upper mold 62 and both the sliding molds 63 and 64 to form the cavity C as a molding space. In the process of the downward movement of the upper mold 62, the ring shaped projection 622 of the columnar projecting portion of the upper mold enters the upper recesses (43, 45) of the holder membrane supporting portion 41, and abuts against the upper surface of the gas permeable membrane S arranged at the holder membrane supporting portion 41. At that time, the ring shaped projection 622 presses the gas permeable membrane S against the step portion 43 with a degree of pressing force such that the gas permeable membrane S is slightly compressed in the thickness direction thereof. That is, the gas permeable membrane S is sandwiched by the ring shaped projection 622 and the step portion 43. As a result, the outer region of the gas permeable membrane S that is partitioned by the ring shaped projection 622 can be exposed into the cavity C so as to be brought into direct contact with the molding resin. Meanwhile, the inner region of the gas permeable membrane S partitioned by the ring shaped projection 622, the dish shaped recess 623 of the columnar projecting portion of the upper mold, the lower recess 46 of the holder, and the ventilation groove 47 are separated from the cavity C by an opening end of the ventilation groove 47 being closed by a wall surface of the sub insert supporting recess 632. Thereby, the entry of the molding resin is prevented.

(Resin Filling Step)

After the mold closing is completed, the molding resin fills the cavity C via a gate (not shown) of the upper mold 62. The resin filling the cavity C is cooled and hardened to form the main portion 33 of the gas permeable part 30. Additionally, the filling resin contacts with the outer peripheral edge of the gas permeable membrane S (outer region of the gas permeable membrane S partitioned by the ring shaped projection 622), and integrates the outer peripheral edge of the gas permeable membrane S with a portion of the main portion 33 (bonding portion 36). Since the gas permeable membrane S is directly bonded to the main portion 33, the bonding strength therebetween becomes high. Additionally, the filled main portion 33 shrinks in the process in which the filling resin is cooled and hardened. A force (shrinkage force) caused by this shrinkage acts toward the holder 40 and the bus-bar 50 in a contact state and works in a direction in which the close contact therebetween is assured. As a result, the shape of the second ventilation path P2 constituted mainly by the ventilation groove 47 within the main portion 33 is stabilized, and the airtightness of a path wall that constitutes the second ventilation path P2 (particularly, a path wall of a bonding region between the holder 40 and the bus-bar 50) is improved.

(Mold Opening Step)

The molding die is opened after the completion of the filling of the resin and the cooling and hardening of the resin. Specifically, first, the upper mold 62 is moved upward (retreated) from the mold closing position of FIG. 4 to a standby position thereabove. By moving the upper mold 62 upward, the ventilation hole 34 of the main portion 33 of the gas permeable part is formed in a removal mark of the columnar projecting portion 621 from a resin molded product. Additionally, with the retreat of the upper mold 62, the left and right slidable cores 63 and 64 move horizontally in separating directions, and retreat to their respective standby positions from the setting position of FIG. 4. After all the movable molds (62, 63, 64) has retreated to predetermined standby positions, the gas permeable part 30 of the first embodiment is obtained by taking out the resin molded product. The gas permeable part 30 is a composite molded body in which the main portion 33, the inserted member (40, 50), and the gas permeable membrane S are integrated together.

In the first embodiment, the ventilation channel within the main portion 33 of the gas permeable part 30 is constituted by the first ventilation path P1 and the second ventilation path P2 that are continuous with each other but extend in different directions. Thus, the gas permeable part 30 as the composite molded body having the gas permeable membrane S can be integrally molded by the injection molding at one time, in a state where the gas permeable membrane S is arranged in the midway portion of the ventilation channel that is bent in its midway portion such that the opening end (35) at the external air side and the opening end at the casing internal space side are not linearly connected together. Additionally, by allowing the gas permeable membrane S to be placed on the membrane supporting portion 41 of the holder 40 as the first inserted member, the gas permeable membrane S can be positioned during injection molding, and the gas permeable membrane S can be easily arranged in the midway portion of the ventilation channel.

[Second Embodiment]

Figure 6:
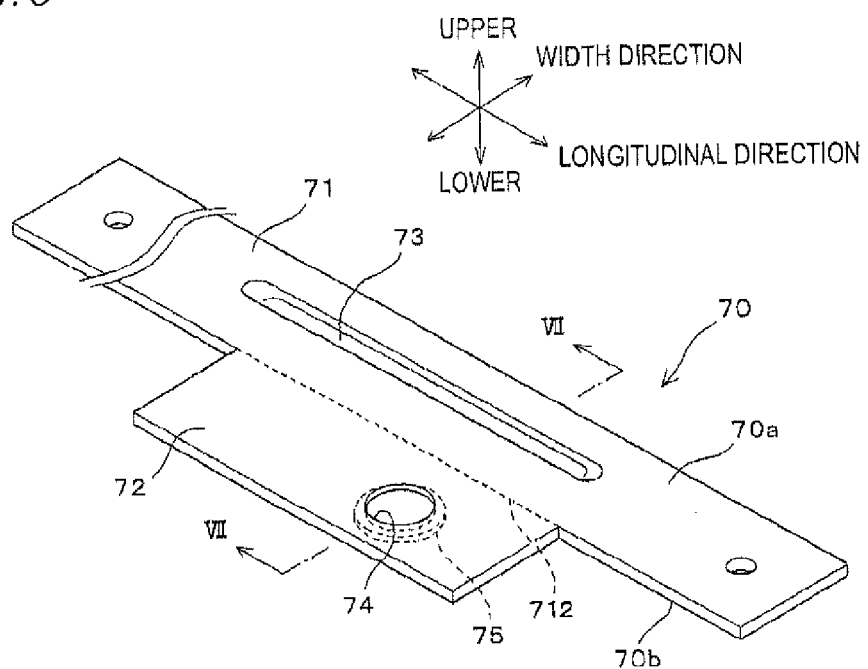
FIG. 6 is a perspective view showing an inserted member to be used in a second embodiment.
Figure 7:
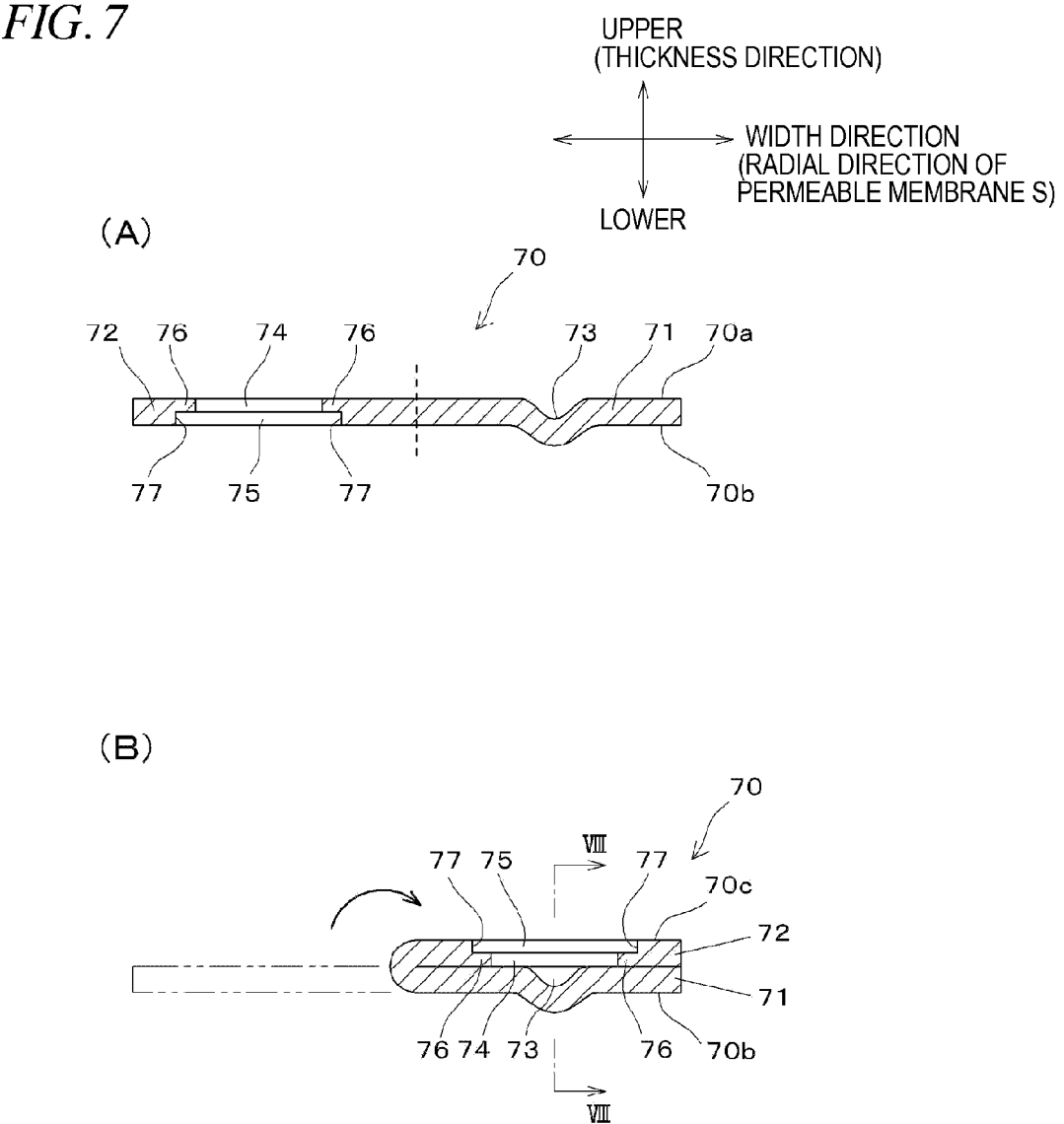
FIG. 7(A) is a cross-sectional view taken along line VII-VII of FIG. 6.
FIG. 7(B) is a cross-sectional view showing a state after bending of the inserted member.
Figure 8:
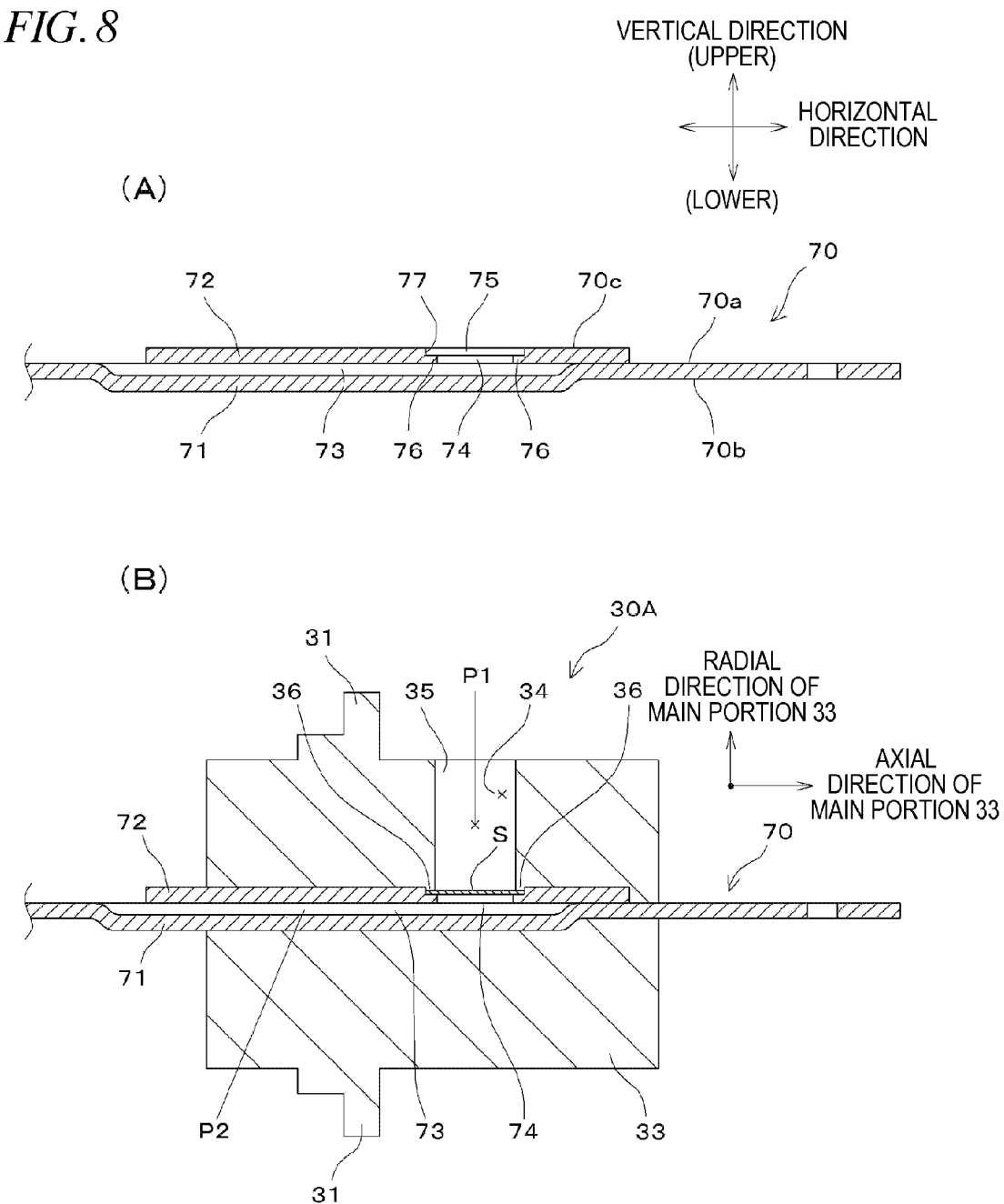
FIG. 8(A) is a longitudinal sectional view taken along line VIII-VIII of FIG. 7(B)
FIG. 8(B) is a longitudinal sectional view of a composite molded body (gas permeable part) of the second embodiment.

FIGS. 6 to 8 show a second embodiment of the invention. Although two inserted members 40 and 50 are used in the first embodiment, the second embodiment relates to a composite molded body (gas permeable part 30A) using a single inserted member 70.

As shown in FIG. 6, the inserted member 70 of the second embodiment is a flat square bar-shaped metallic plate material having a rectangular cross-section, and has a rectangular plate main portion 71 that extends along a longitudinal direction, and a rectangular elongated portion 72 that overhangs from the plate main portion 71 to one side in its width direction. Since the inserted member 70 is a thin metal plate, the inserted member is bendable at a root position (see dashed line 712, shown in FIG. 6) of the elongated portion 72, more specifically, along a boundary line (a dashed line 712, shown in FIG. 6 is where a root of the elongated portion 72 is bendably formed) between the elongated portion 72 and the plate main portion 71. Moreover, as shown in FIGS. 6 and 7(A), a ventilation groove 73 recessed with respect to an upper surface 70a is formed in the plate main portion 71 by press working. Meanwhile, the elongated portion 72 is formed with a through hole 74 that passes through the extending portion in its thickness direction and is circular in a plan view, and a large-diameter circular recess 75 that is adjacent to the through hole 74 and has a larger diameter than that of the through hole 74. In a state before bending shown in FIG. 7(A), the through hole 74 is located at an upper surface 70a side, and the circular recess 75 is located at a lower surface 70b side.

The deformed inserted member 70 as shown in FIGS. 7(B) and 8(A) can be obtained by folding the elongated portion 72 of the inserted member 70 at its root and superimposing the upper surface of the elongated portion 72 on an upper surface of the plate main portion 71. After the completion of the deformation, the elongated portion 72 that covers a portion of the upper surface of the plate main portion 71 makes the ventilation groove 73 into a tunnel shape except for its one end portion. Additionally, a lower surface of the elongated portion 72 serves as an top surface 70c of the inserted member 70, the circular recess 75 opens upward, and the circular recess 75 communicates with the tunnel-like ventilation groove 73 via the through hole 74. Moreover, in the state where the deformation is completed, an annular inner wall portion 76 that forms the through hole 74 forms a step portion 76 at a boundary position between the circular recess 75 and the through hole 74 having a smaller diameter than the circular recess 75. The gas permeable membrane S can be placed by using the step portion 76 (see FIG. 8(B)). That is, the elongated portion 72 after the bending constitutes a membrane supporting portion including the circular recess 75 and the step portion 76, and an inner wall portion 77 of the circular recess 75 functions as a peripheral wall portion that regulates radial movement of the gas permeable membrane placed on the step portion. In addition, the internal diameter of the circular recess 75 is configured to be equal to the external diameter of the gas permeable membrane S or to be greater than the external diameter of the gas permeable membrane S.

The gas permeable part 30A as shown in FIG. 8(B) can be obtained by using the inserted member 70 of the second embodiment instead of the two inserted members (40, 50) of the aforementioned first embodiment, and performing the same injection molding as that of the first embodiment. As a result, similarly to the first embodiment, the main portion 33 of the gas permeable part 30A is formed with the ventilation hole 34, and the portion that forms the ventilation hole 34 is formed with the bonding portion 36 to which the gas permeable membrane S is bonded. Also, the first ventilation path P1 that extends in the vertical direction (the radial direction of the main portion 33 of the gas permeable part) of the drawing is formed by the ventilation hole 34, the gas permeable membrane S, and the through hole 74, and the second ventilation path P2 that extends in the horizontal direction (the axial direction of the main portion 33 of the gas permeable part) of the drawing is formed by the ventilation groove 73. One end portion of the second ventilation path P2 opens to the internal space of the casing.

According to the gas permeable part 30A of the second embodiment, the same effects as those of the first embodiment are exhibited. Additionally, since the second ventilation path P2 can be formed, simply by performing mechanical processing on the single inserted member 70, there is a merit in that the number of members can be reduced compared to the first embodiment. Moreover, close contact between the plate main portion 71 and the elongated portion 72 that are superimposed on each other can be assured by a shrinkage force generated when the resin material that forms the main portion 33 shrinks during injection molding. As a result, the shape of the second ventilation path P2 can be stabilized, and the airtightness of the path wall that constitutes the ventilation path can be improved.

[Modified Example of First and Second Embodiments]

In the aforementioned first and second embodiments, the first ventilation path P1 of the gas permeable part 30 or 30A as a composite molded body is arranged outside the casing 10, that is, is mounted on the external surface side of the side wall 13 of the casing main body 11. In contrast, the first ventilation path P1 of the gas permeable part 30 or 30A may be mounted inside the casing 10, that is, may be mounted on an inner surface side of the side wall 13 of the casing main body 11. As the technique of mounting the gas permeable part 30 or 30A on the inner surface side of the side wall 13 of the casing main body, there is a method of arranging the gas permeable part 30 or 30A inside the casing 10 so that the mounting flange 31 (see FIGS. 1, 2(A), and 8(B)) abuts on an inner surface of the side wall 13 of the casing main body. Additionally, as another mounting technique, there is a method of inserting the gas permeable part 30 or 30A into the mounting hole 14 (see FIG. 1) of the casing from the outside of the casing 10 toward the inside thereof so that the gas permeable membrane S and the membrane supporting portion 41 are arranged within the casing 10. In that case, as the mounting flange 31 abuts on an external surface of the side wall 13 of the casing main body, further entry of the gas permeable part to the inside of the casing is regulated.

When the gas permeable part 30 or 30A is arranged inside the casing 10, the gas permeable membrane S and the first ventilation path P1 are accommodated within the internal space of the casing 10. As a result, the opening end of the first ventilation path P1 leads to the internal space of the casing 10, the opening end of the second ventilation path P2 leads to the external air, and the gas permeable membrane S and the first ventilation path P1 within the internal space of the casing 10 leads to the external air via the second ventilation path P2. The advantages that the gas permeable membrane S of the gas permeable part 30 or 30A is accommodated within the internal space of the casing 10 are to reliably avoid that the gas permeable membrane S comes into contact with other members or receives mechanical interference from other members.

[Third Embodiment]

Figure 9:
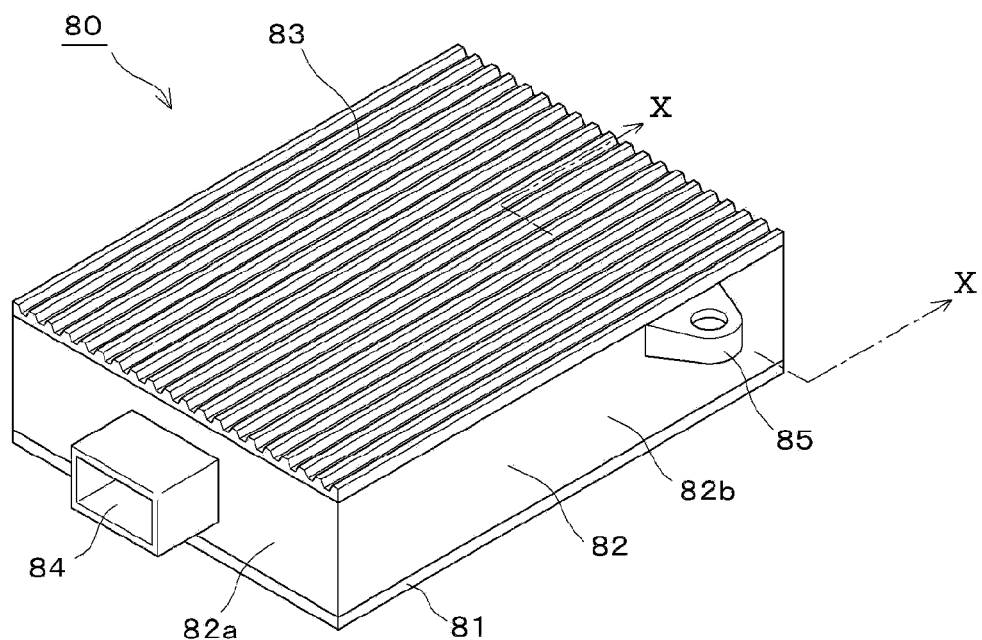
FIG. 9 is a schematic perspective view showing a composite molded body (casing with which a gas permeable part is integrated in advance) of a third embodiment.
Figure 12:
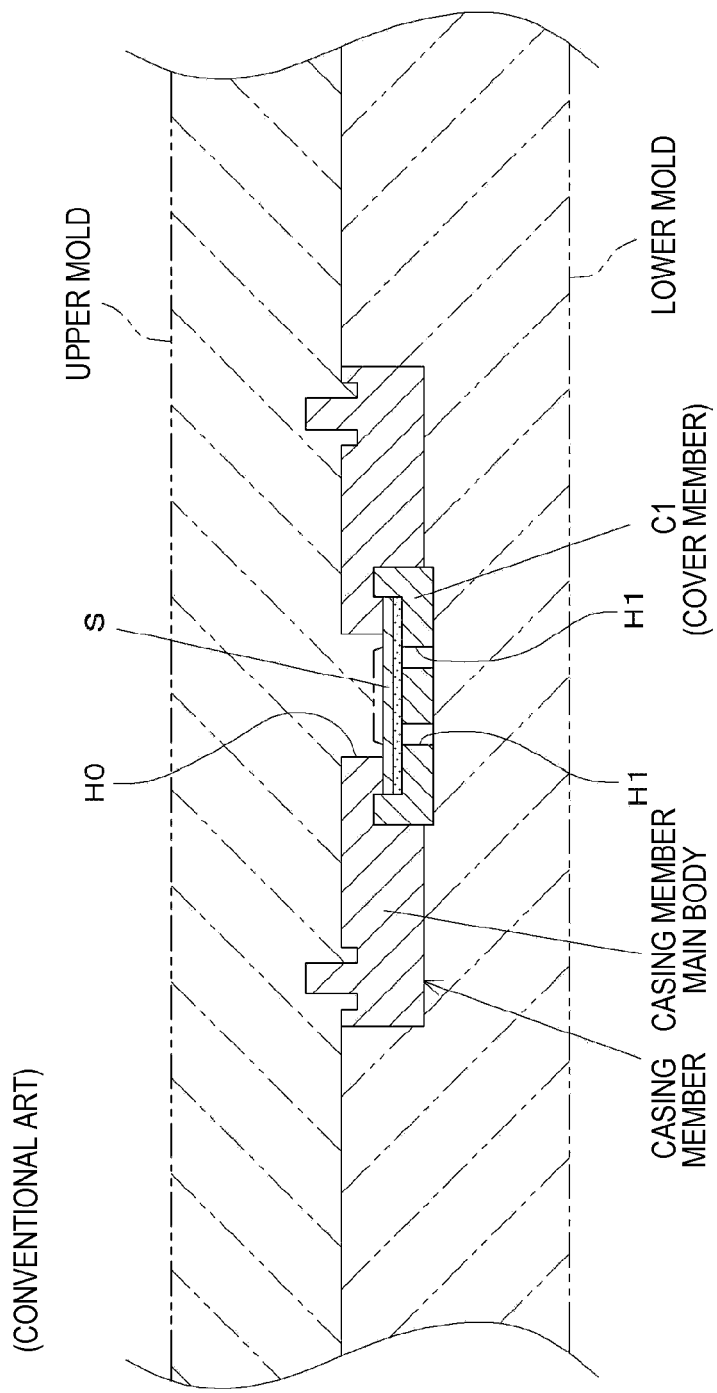
FIG. 12 is a schematic cross-sectional view of a gas permeable part of the conventional art.

FIGS. 9 and 10 show a third embodiment of the invention. The third embodiment relates a composite molded body in which a gas permeable part including a gas permeable membrane and a ventilation channel is integrated with a casing 80 in advance.

As shown in FIG. 9, the casing 80 includes a lower lid 81 that constitutes a bottom wall of the casing, a casing main body 82 that constitutes four side walls of the casing, and a heat sink 83 that corresponds to an upper lid of the casing and has a corrugated plate shape. The lower lid 81 and the casing main body 82 are resin molded products, and the heat sink 83 is made of metal (for example, aluminum). One side wall 82a of the casing main body 82 is provided with a socket 84 that has a bus-bar (not shown) therein, and a protruding portion 85 holding a gas permeable membrane is integrally molded with the casing main body 82 in another side wall 82b of the casing main body 82.

As shown in FIG. 10(A), the protruding portion 85 of the casing main body corresponds to the main portion 33 of the gas permeable part of the first embodiment, and the ventilation hole 34 is formed in the protruding portion 85, similarly to the main portion 33. An upper end of the ventilation hole 34 serves as an opening end 35 that opens to an upper surface of the protruding portion 85. A holder 40A and a path consisting member 55 as first and second inserted members are embedded within the protruding portion 85. The holder 40A as the first inserted member is a resin molded product having almost the same structure as the holder 40 used in the first embodiment, and has the membrane supporting portion 41 that supports the gas permeable membrane S, the extending portion 42, the step portion 43, the through hole 44, and the peripheral wall portion 45. The first ventilation path P1 that extends in the vertical direction is formed, and the first ventilation path P1 has the ventilation hole 34 of the protruding portion 85, the gas permeable membrane S, and the through hole 44.

The path consisting member 55 as the second inserted member is a plate-shaped resin molded product bondable to a lower surface of the holder 40A, is preferably fitted to the holder 40A, and is formed in a shape that can prevent positional displacement. An upper surface (a surface bonded to the holder 40A) of the path consisting member 55 is formed with a ventilation groove 56. The second ventilation path P2 that extends in the horizontal direction by the ventilation groove 56 is formed by bonding the holder 40A and the path consisting member 55. The external air and the internal space of the casing 80 communicate with each other via the first ventilation path P1 and the second ventilation path P2, and thus, occurrence of the pressure difference between the inside and outside of the casing 80 is prevented.

In addition, as shown in FIG. 10(B), a cover portion 86 may be provided on an upper side of the protruding portion 85. Although the cover portion 86 is a protecting portion for protecting the gas permeable membrane S so that a direct access cannot be made to the gas permeable membrane S from the upside of the casing 80, a clearance 87 is secured between the cover portion 86 and the protruding portion 85 in order to allow the first ventilation path P1 to communicate with the external air. The clearance 87 may be formed by cutting-out of a lower surface of the cover portion 86 as shown in FIG. 10(B), or may be formed by a groove (not shown) provided in an upper surface of the protruding portion 85. Additionally, the cover portion 86 may be provided by partially extending an end portion of the heat sink 83.

[Other Modified Examples]

In the first embodiment, the ventilation groove 47 is provided in the first inserted member (holder 40). Instead of this, however, a similar ventilation groove may be provided to the second inserted member (bus-bar 50). Alternatively, the second ventilation path P2 may be formed by providing a ventilation groove, which faces the ventilation groove 47 of the holder 40, also in the bus-bar 50, and uniting both the ventilation grooves. Additionally, the membrane supporting portion 41 that is a portion on which the gas permeable membrane S is placed may have a shape that has neither the inner wall portion (step portion) 43 nor the peripheral wall portion 45. Further, the formation directions of the first and second ventilation paths P1 and P2 are not necessarily the vertical direction and the horizontal direction. For example, the first ventilation path P1 may be formed to incline with respect to the horizontal direction. Additionally, the second ventilation path P2 may be formed in a direction that is not perpendicular to the first ventilation path P1 (non-perpendicular direction).

In the invention, a plurality of second ventilation paths P2 may be formed. For example, as shown in FIG. 11(A), two streaks of the ventilation groove 47 may be formed in the holder 40. Additionally, in the invention, the second ventilation path P2 may branch at its midway portion. For example, as shown in FIG. 11(B), a bypass 47a and/or 47b branched at its midway portion from the ventilation groove 47 may be formed in the holder 40. By providing a plurality of the second ventilation paths P2 and making the second ventilation path into branch structure, the number of opening ends on the internal space side of the casing can be increased. As a result, even when one ventilation path is closed due to a certain reason, permeability can be secured by the other ventilation path.

REFERENCE SIGNS LIST

10: CASING
30, 30A: GAS PERMEABLE PART (COMPOSITE MOLDED BODY)
33: MAIN PORTION
34: VENTILATION HOLE
35: OPENING END OF VENTILATION HOLE
36: BONDING PORTION (THICKNESS PORTION THAT FORMS VENTILATION HOLE 34)
40, 40A: HOLDER (FIRST INSERTED MEMBER)
41: MEMBRANE SUPPORTING PORTION
42: EXTENDING PORTION
43: STEP PORTION (INNER WALL PORTION 43 THAT FORMS THROUGH HOLE 44)
44: THROUGH HOLE
45: PERIPHERAL WALL PORTION
47: VENTILATION GROOVE
50: BUS-BAR (SECOND INSERTED MEMBER)
55: PATH CONSISTING MEMBER (SECOND INSERTED MEMBER)
56: VENTILATION GROOVE 56
61: LOWER MOLD (MOLDING DIE)
62: UPPER MOLD (MOLDING DIE)
63: LEFT SLIDABLE CORE (MOLDING DIE)
64: RIGHT SLIDABLE CORE (MOLDING DIE)
70: INSERTED MEMBER
71: PLATE MAIN PORTION
72: ELONGATED PORTION
73: VENTILATION GROOVE
74: THROUGH HOLE
75: CIRCULAR RECESS (MEMBRANE SUPPORTING PORTION)
76: STEP PORTION (INNER WALL PORTION 76 THAT FORMS THROUGH HOLE 74)
77: INNER WALL PORTION OF CIRCULAR RECESS (PERIPHERAL WALL PORTION)
80: CASING (COMPOSITE MOLDED BODY)
85: PROTRUDING PORTION FOR HOLDING GAS PERMEABLE MEMBRANE (CORRESPONDING TO MAIN PORTION OF COMPOSITE MOLDED BODY)
C: CAVITY
P1 FIRST VENTILATION PATH
P2: SECOND VENTILATION PATH
S: GAS PERMEABLE MEMBRANE

The invention claimed is:

1. A composite molded body that is mountable on or integrated in advance with a casing having an internal space, the composite molded body comprising:
a main portion formed of an injection-moldable resin material;
a ventilation channel configured inside the main portion to allow the internal space of the casing to communicate with external air; and
a gas permeable membrane disposed in a midway portion of the ventilation channel,
wherein the composite molded body further includes an inserted member having at least a portion thereof embedded in the main portion, a portion of the inserted member being exposed to at least one of the internal space of the casing and the external air, wherein the ventilation channel includes a first ventilation path having the gas permeable membrane at its midway portion, and at least one second ventilation path continuous with the first ventilation path, wherein the gas permeable membrane is arranged within the first ventilation path so as to block the passing of liquids, liquid droplets, and solid matter through the first ventilation path, wherein the first ventilation path extends in a direction intersecting the gas permeable membrane and has an opening end leading to the external air or the internal space of the casing, wherein the second ventilation path extends in a direction non-parallel to the direction in which the first ventilation path extends and has an opening end leading to the internal space of the casing or the external air, at least a portion of the second ventilation path being formed by the inserted member, wherein the inserted member has a membrane supporting portion having the gas permeable membrane placed thereon and having a through hole formed thereto, and wherein the through hole constitutes a portion of the first ventilation path and communicates with the internal space of the casing or the external air via the second ventilation path.

2. The composite molded body according to claim 1, wherein the main portion is formed with a ventilation hole that constitutes a portion of the first ventilation path and constitutes the opening end of the first ventilation path, the ventilation hole being adjacent to the through hole of the membrane supporting portion of the inserted member via the gas permeable membrane, and wherein an inner wall portion of the main portion that forms the ventilation hole is formed with a bonding portion to which the gas permeable membrane is bonded, and an outer peripheral edge of the gas permeable membrane is sandwiched by the bonding portion and the membrane supporting portion of the inserted member.

3. The composite molded body according to claim 2, wherein both a cross-sectional area of the through hole of the membrane supporting portion and a cross-sectional area of the ventilation hole of the main portion are configured to be smaller than an area of the gas permeable membrane, the cross-sectional area of the through hole of the membrane supporting portion is configured to be smaller than the cross-sectional area of the ventilation hole of the main portion, and a step portion is formed at a boundary position between the through hole and the ventilation hole.

4. The composite molded body according to claim 1, wherein the membrane supporting portion of the inserted member has a peripheral wall portion provided so as to surround the through hole, and an internal diameter of the peripheral wall portion is equal to an external diameter of the gas permeable membrane or is larger than the external diameter of the gas permeable membrane.

5. The composite molded body according to claim 1, wherein the inserted member has an extending portion that extends from the membrane supporting portion, the extending portion extending in a direction non-parallel to the direction in which the first ventilation path extends and being formed with at least a portion of the second ventilation path.

6. The composite molded body according to claim 1, wherein the inserted member includes a first inserted member and a second inserted member, wherein the first inserted member includes the membrane supporting portion formed with the through hole, and wherein at least one of the first inserted member and the second inserted member is formed with a ventilation groove, and wherein the ventilation groove forms the second ventilation path by bringing the first and second inserted members into contact with each other, and the second ventilation path formed by the ventilation groove communicates with the first ventilation path formed by the through hole of the first inserted member.

7. The composite molded body according to claim 6, wherein the first inserted member is a resin molded product that is molded in advance, and the second inserted member is a metal component that is molded in advance.

8. The composite molded body according to claim 6, wherein close contact between the first and second inserted members that contacts with each other is assured by a shrinkage force generated when the resin material that forms the main portion shrinks after injection molding.

9. The composite molded body according to claim 1, wherein the inserted member has an elongated plate main portion, and an elongated portion elongating from the plate main portion to one side in its width direction, wherein at least a root of the elongated portion is bendably formed, wherein the plate main portion is formed with a ventilation groove for providing at least the second ventilation path, and the elongated portion is formed with the membrane supporting portion and the through hole, and wherein the through hole and the ventilation groove are formed adjacent to each other via the gas permeable membrane and communicate with each other by folding the elongated portion at the root thereof and superimposing the elongated portion on the plate main portion.

10. The composite molded body according to claim 9, wherein close contact between the plate main portion and the elongated portion that are superimposed on each other is assured by a shrinkage force generated when the resin material that forms the main portion shrinks after injection molding.

11. The composite molded body according to claim 1, wherein a plurality of the second ventilation paths are formed.

12. The composite molded body according to claim 1, wherein the second ventilation path branches at its midway portion.

13. A method for manufacturing a composite molded body that is mountable on or integrated in advance with a casing having an internal space, the composite molded body comprising:
a main portion formed of an injection-moldable resin material;
a ventilation channel configured inside the main portion to allow the internal space of the casing to communicate with external air;
a gas permeable membrane disposed in a midway portion of the ventilation channel; and
an inserted member having at least a portion thereof embedded in the main portion, wherein a portion of the inserted member is exposed to at least one of the internal space of the casing and the external air, the method comprising:

a preparing step of preparing a molding die capable of forming a cavity when the molding die is closed and capable of arranging the inserted member within the cavity;

an arranging step of arranging the inserted member inside the opened molding die and arranging the gas permeable membrane at a desired position by using the inserted member;

a mold closing step of closing the molding die to form the cavity for molding the main portion;

a resin filling step of filling the cavity with a resin material to mold the main portion; and a mold opening step of opening the molding die and taking-out the composite molded body in which the main portion, the inserted member, and the gas permeable membrane are integrated, wherein the ventilation channel of the composite molded body obtained by using the method includes a first ventilation path having the gas permeable membrane at its midway portion, and at least one second ventilation path continuous with the first ventilation path, wherein the gas permeable membrane is arranged within the first ventilation path so as to block the passing of liquids, liquid droplets, and solid matter through the first ventilation path, wherein the first ventilation path extends in a direction intersecting the gas permeable membrane and has an opening end leading to the external air or the internal space of the casing, wherein the second ventilation path extends in a direction non-parallel to the direction in which the first ventilation path extends and has an opening end leading to the internal space of the casing or the external air, at least a portion of the second ventilation path being formed by the inserted member, wherein the inserted member has a membrane supporting portion having the gas permeable membrane placed thereon and having a through hole formed thereto, and wherein the through hole constitutes a portion of the first ventilation path and communicates with the internal space of the casing or the external air via the second ventilation path.

14. The method for manufacturing a composite molded body according to claim 13, wherein, in the mold closing step, the gas permeable membrane is sandwiched by a portion of a mold forming the cavity for molding the main portion and the inserted member, so that an outer peripheral edge of the gas permeable membrane is exposed into the cavity, and wherein, in the resin filling step, the resin material filled into the cavity is bonded to the outer peripheral edge of the gas permeable membrane so as to integrate the outer peripheral edge of the gas permeable membrane with the main portion.

15. The method for manufacturing a composite molded body according to claim 13, wherein, in the arranging step, the inserted member arranged inside the opened molding die is provided by bringing a first inserted member and a second inserted member into contact with each other or assembling the first inserted member and the second inserted member in advance so as to form at least the second ventilation path between the both inserted members.

16. The method for manufacturing a composite molded body according to claim 13, wherein, in the arranging step, the inserted member arranged inside the opened molding die is provided by bending and deforming a bendable inserted member in advance so as to form at least the second ventilation path, is mountable on or integrated in advance with a casing having an internal space.

17. The composite molded body according to claim 1, wherein either the composite molded body is mounted on the casing having an internal space, or the composite molded body is integrated into the casing having an internal space.

18. The method for manufacturing a composite molded body according to claim 13, further comprising inserting the composite molded body into a mounting hole of the casing having an internal space.

19. The method for manufacturing a composite molded body according to claim 13, wherein the gas permeable membrane and the ventilation channel are integrated with the casing having an internal space.

20. A casing having an internal space, the casing comprising:

a composite molded body that is either mounted on the casing or integrated in the casing, the composite molded body comprising:

a main portion formed of an injection-moldable resin material;

a ventilation channel configured inside the main portion to allow the internal space of the casing to communicate with external air; and a gas permeable membrane disposed in a midway portion of the ventilation channel, wherein the composite molded body further includes an inserted member having at least a portion thereof embedded in the main portion, a portion of the inserted member being exposed to at least one of the internal space of the casing and the external air, wherein the ventilation channel includes a first ventilation path having the gas permeable membrane at its midway portion, and at least one second ventilation path continuous with the first ventilation path, wherein the gas permeable membrane is arranged within the first ventilation path so as to block the passing of liquids, liquid droplets, and solid matter through the first ventilation path, wherein the first ventilation path extends in a direction intersecting the gas permeable membrane and has an opening end leading to the external air or the internal space of the casing, wherein the second ventilation path extends in a direction non-parallel to the direction in which the first ventilation path extends and has an opening end leading to the internal space of the casing or the external air, at least a portion of the second ventilation path being formed by the inserted member, wherein the inserted member has a membrane supporting portion having the gas permeable membrane placed thereon and having a through hole formed thereto, and wherein the through hole constitutes a portion of the first ventilation path and communicates with the internal space of the casing or the external air via the second ventilation path.

* * * * *